United States Patent
Romer et al.

(10) Patent No.: US 11,911,757 B2
(45) Date of Patent: Feb. 27, 2024

(54) PIPETTING DEVICE FOR PULSED PIPETTING WITH A PIPETTING PISTON MOVEMENT CONTROLLED ON THE BASIS OF A DETECTION OF THE PISTON POSITION

(71) Applicant: Hamilton Bonaduz AG, Bonaduz (CH)

(72) Inventors: Hanspeter Romer, Hinwil (CH); Reto Ettinger, Uster (CH); Fridolin Gysel, Adliswil (CH); Jürg Rast, Schmerikon (CH); Jonas Hilti, Zürich (CH)

(73) Assignee: HAMILTON BONADUZ AG, Bonaduz (CH)

( * ) Notice: Subject to any disclaimer, the term of this patent is extended or adjusted under 35 U.S.C. 154(b) by 556 days.

(21) Appl. No.: 17/258,488

(22) PCT Filed: Jul. 9, 2019

(86) PCT No.: PCT/EP2019/068417
§ 371 (c)(1),
(2) Date: Jan. 8, 2021

(87) PCT Pub. No.: WO2020/011787
PCT Pub. Date: Jan. 16, 2020

(65) Prior Publication Data
US 2021/0154659 A1 May 27, 2021

(30) Foreign Application Priority Data

Jul. 11, 2018 (DE) .................... 10 2018 211 497.8

(51) Int. Cl.
*B01L 3/02* (2006.01)

(52) U.S. Cl.
CPC .......... *B01L 3/0227* (2013.01); *B01L 3/0237* (2013.01); *B01L 3/0268* (2013.01);
(Continued)

(58) Field of Classification Search
CPC .... B01L 3/0227; B01L 3/0237; B01L 3/0268; B01L 2200/14; B01L 2300/0663;
(Continued)

(56) References Cited

U.S. PATENT DOCUMENTS

2001/0016358 A1   8/2001   Osawa
2011/0318242 A1   12/2011   Nay
(Continued)

FOREIGN PATENT DOCUMENTS

DE   10 2012 214 677 A   2/2014
DE   10 2015 214 566 A   2/2017
(Continued)

OTHER PUBLICATIONS

International Search Report as filed in PCT/EP2019/068417 filed on Jul. 9, 2019.
German Search Report as filed in 10 2018 211 497.8 dated Mar. 11, 2019.

*Primary Examiner* — Brandi N Hopkins
(74) *Attorney, Agent, or Firm* — Rankin, Hill & Clark LLP

(57) ABSTRACT

A pipetting device includes a pipetting channel at least partially filled with working gas, a pipetting tip accessible through a pipetting opening such that the volume of dosing liquid drawn into the receiving chamber can be varied by changing the pressure of the working gas in the receiving chamber, a pipetting piston for changing the pressure of the working gas and accommodated in the pipetting channel to be movable along the pipetting channel, a drive driving the pipetting piston to perform a movement along the pipetting channel, a control device controlling the drive, and a pressure sensor sensing the pressure of the working gas. The control device controls the drive to generate a pressure pulse in the pipetting channel based on the pressure signal output (Continued)

by the pressure sensor whereby the pressure of the working gas during the pulse follows a predefined working gas target pressure pulse curve.

19 Claims, 8 Drawing Sheets

(52) U.S. Cl.
CPC ... *B01L 2200/14* (2013.01); *B01L 2300/0663* (2013.01); *B01L 2400/043* (2013.01); *B01L 2400/0478* (2013.01)

(58) Field of Classification Search
CPC ......... B01L 2400/04; B01L 2400/0478; B01L 3/0265; B01L 3/0224; B01L 3/0234; G01N 30/91; G01N 35/109; G01N 35/10; G01N 11/04; G01N 35/1004; G01N 35/1074; G01N 35/1065; G01M 3/26; B65B 3/003; G05B 19/409; G01F 11/04
See application file for complete search history.

(56) References Cited

U.S. PATENT DOCUMENTS

| | | | |
|---|---|---|---|
| 2014/0138405 A1 | 5/2014 | Inoue | |
| 2018/0185836 A1* | 7/2018 | Romer | B01L 3/0237 |
| 2019/0358626 A1 | 11/2019 | Romer | |
| 2020/0209274 A1* | 7/2020 | Dunker | G01N 35/1016 |

FOREIGN PATENT DOCUMENTS

| | | |
|---|---|---|
| DE | 10 2017 201 114 A | 7/2018 |
| EP | 2 656 917 A1 | 10/2013 |
| JP | 2018-523120 | 8/2018 |
| JP | 2020-514015 | 5/2020 |
| JP | 2006-132984 | 3/2023 |
| JP | 2008-197037 | 3/2023 |
| WO | 2013094373 | 6/2013 |
| WO | 2017017084 | 2/2017 |
| WO | 2018108825 | 6/2018 |

\* cited by examiner

PIPETTING DEVICE FOR PULSED PIPETTING WITH A PIPETTING PISTON MOVEMENT CONTROLLED ON THE BASIS OF A DETECTION OF THE PISTON POSITION

BACKGROUND

The present invention relates to a pipetting apparatus for pulsed pipetting of dosage liquids in small metered volumes of less than 2 µl with the aid of a modifiable-pressure working gas.

By way of the control apparatus, the motion drive system is specifically controllable so as to bring about a pipetting operation, in order to move the pipetting piston in a desired manner by corresponding application of control to the motion drive system and thereby in turn to modify the pressure of the working gas in a desired manner.

Pulsed dispensing for purposes of the present invention is known from US 2001/0016358 A1. Here, however, a positive-pressure pulse is not imparted by a working gas, but instead a physical blow is delivered directly by a piezoactuator onto the meniscus, located farther from the pipetting opening, of the dosage liquid furnished in the pipetting apparatus, and a droplet is thereby ejected, at the oppositely located longitudinal end of the dosage-liquid column that is furnished, from the meniscus located closer to the pipetting opening.

The disadvantages of this known method are apparent: an elevated risk of contamination exists because of the contact between the piezoactuator and the dosage liquid.

A pulsed-pipetting pipetting apparatus for purposes of the present Application is described in DE 10 2015 214 566 A1.

SUMMARY OF THE INVENTION

An object of the present invention is to describe a pipetting apparatus that is capable of pipetting both as hygienically as possible, i.e. with the least possible risk of contamination, and as accurately as possible even for small metered quantities.

According to the present invention this object is achieved by a pipetting apparatus of the kind recited initially which encompasses:
  a pipetting conduit at least partly filled with working gas;
  a pipette tip that furnishes a receiving space that is at least partly filled with working gas, that is pressure-communicatingly connected to the pipetting conduit, and that is accessible through a pipetting opening, so that by means of a modification of the pressure of the working gas in the receiving space, the quantity of dosage liquid received in the receiving space is modifiable through the pipetting opening;
  a pipetting piston received in the pipetting conduit, movably along the pipetting conduit, for modifying the pressure of the working gas;
  a motion drive system for driving the pipetting piston to move along the pipetting conduit;
  a control apparatus for applying control to the motion drive system; and
  a position detection apparatus for detecting the position of the pipetting piston and for outputting to the control apparatus a position signal representing the position of the pipetting piston,
the control apparatus being embodied to apply control to the motion drive system in order to generate a pressure pulse—with respect to a reference pressure which exists in the pipetting conduit immediately before a pipetting operation begins and at which no fluid passes through the pipetting opening—in the pipetting conduit, on the basis of the position signal outputted by the position detection apparatus, in such a way that the position of the pipetting piston during the pulse follows a predefined target pipetting-piston position curve, the duration of the pipetting-piston motion for generation of the pressure pulse not exceeding 35 ms.

Because of the embodiment for pipetting using the so-called "air displacement" method, in which the pressure of a working gas present between the pipetting piston and dosage liquid is modified, using the pipetting piston, in order to dispense or aspirate dosage liquid through the pipetting opening, no contact occurs between a component or component portion of the pipetting apparatus (with the exception of the unavoidable pipette tip) and the dosage liquid.

It has furthermore been found that regulation of the piston motion in order to generate a pressure pulse in the working gas in accordance with the working-gas pressure is possible even for very short pressure pulses of less than 40 ms. A piston motion having a duration of no more than 35 ms is sufficient for this. By means of a regulation of the pipetting-piston motion by the control apparatus based on the position of the pipetting piston in the pipetting conduit, on the basis of a target pipetting-piston position curve predetermined for the dosage liquid that is to be pipetted, highly accurate pipetting even of very small quantities of dosage liquid (in the sub-microliter range) is possible.

The piston motion for pulsed pipetting, with a duration of 35 ms or less, is preferably the only piston motion of the pipetting operation, and brings about a motion of dosage liquid of less than 2 µl through the pipetting opening and thus a corresponding metering action.

Regulation of the pipetting-piston motion in accordance with a comparison between the detected actual pressure of the working gas and a target working-gas pressure curve, which is also possible in principle, has proven to be difficult, since resonance effects can occur in the working gas during a pulsed pipetting operation. The Helmholtz resonance effect that is principally responsible for this can result, in the context of a pulsed change in the working-gas pressure, in oscillations in the pressure signal which greatly complicate use of the detected working-gas pressure as a controlled variable.

In the present Application, the "detected value" of a variable is terminologically synonymous with the "actual value" of that variable.

In the present Application, a "pressure pulse" or a "pulsed" pipetting action refers to a pressure pulse on the working gas, bringing about a dosage-liquid uptake (aspiration) into the pipette tip or a dosage-liquid discharge (dispensing) therefrom, having a total pulse duration of no more than 40 ms. Because of inertia-related relaxation effects in the working gas, the duration of the pressure pulse is usually longer than the duration of the pipetting-piston motion that brings about the pressure pulse. The duration of the pipetting-piston motion is the time span between departure from a reference pipetting-piston position or pipetting-piston starting position in which the pipetting piston is located immediately before the pipetting operation, and the pipetting piston's arrival back at a standstill. A dead-center point of a motion reversal, at which a piston speed of zero instantaneously exists, is not a "standstill" of the pipetting piston for purposes of the present Application. When the pipetting piston is in the pipetting-piston starting position immediately before the pipetting operation begins, the reference pressure, at which no dosage liquid is passing through the pipetting opening and at which preferably any dosage liquid present in the pipette tip is held substantially motionless, exists in the working gas.

In order to pipette, in particular in order to detach upon dispensing, a small metered volume of dosage liquid in a defined fashion in a single cohesive droplet, i.e. without undesired satellite droplets, the pressure pulse can preferably encompass a positive-pressure component and a negative-pressure component. In the context of pulsed dispensing, which is substantially more important in practice, the positive-pressure component precedes the negative-pressure component in time in the pressure pulse.

Both the positive-pressure component and the negative-pressure component lie within the indicated pressure-pulse time window of at most 40 ms.

Again with the goal of pipetting the indicated small metered volume in one droplet with no formation of undesired satellite droplets, the target pipetting-piston position curve of a pipetting operation can contain target pipetting-piston positions on either side of the starting position and/or of the final position of the pipetting piston respectively at the beginning or end of the pipetting operation. In the context of pulsed dispensing, at least a majority of the target pipetting-piston positions that are located on that side of the starting position which elevates the working-gas pressure (dispensing side) precede in time the target pipetting-piston positions that are located on the side that decreases the working-gas pressure (aspiration side). If the starting position and final position of the pipetting piston for a pipetting operation are identical, which is possible in principle for pulsed pipetting, preferably all the target pipetting-piston positions located on the dispensing side of the starting position and final position precede in time all the target pipetting-piston positions located on the aspiration side of the starting position and final position. If, on the other hand, the final position of the pipetting piston for a dispensing operation is located remotely from its starting position on the dispensing side of the starting position, the entire target pipetting-piston position curve for generating the pipetting pressure pulse can be located on one and the same side of the starting position. The target pipetting-piston position curve is then always located, however, on both sides (dispensing side and aspiration side) of the final position of the piston motion. Regardless of the relative locations of the starting position and final position of the piston motion with respect to one another, the target pipetting-piston position curve preferably encompasses at least two, particularly preferably exactly two, dead-center points of a motion reversal. This means, in other words, that the pipetting-piston motion comprises no more than three, particularly preferably only three, chronologically successive motion phases in which the motion direction of the piston in a subsequent phase is opposite to the motion direction in the respective immediately preceding phase. Taking the example of a pulsed dispensing operation, in the first phase the pipetting piston moves only in a dispensing direction, then in the second phase moves only in an aspiration direction, and lastly in the third phase again moves only in a dispensing direction. The third phase as a rule has the shortest duration in time, with the shortest piston motion travel.

In the simplest case of a pipetting-piston motion that has a particularly short duration in time, the motion direction of the pipetting piston changes only once during a pipetting operation, from (taking the example of a dispensing operation) a motion in a dispensing direction to a motion in an aspiration direction. The aforesaid third phase can then be omitted.

The term "pulsed" dispensing refers to a dispensing action deviating from the conventional known pipetting mode. In pulsed dispensing, a pressure surge is exerted by the positive-pressure pulse of the working gas from the working gas onto that side of a dosage-fluid quantity, received in a pipetting apparatus, which faces away from a metering opening. This pressure surge propagates through the incompressible dosage-liquid quantity to a meniscus, located closer to the pipetting opening, of the received dosage-liquid quantity, and results there in ejection of a dosage-liquid droplet. Ejection of the dosage-liquid droplet can be triggered in defined fashion by a whip-like piston motion in which a sharply accelerated piston motion in a dispensing direction is in turn followed immediately in time by a sharply accelerated piston motion in an aspiration direction. The resulting negative-pressure component in the pressure-pulse curve of the working gas is quantitatively smaller than and no longer in time than, preferably in fact shorter than, the preceding positive-pressure component.

It is thereby possible for very small quantities of liquid—less than 2 µl or preferably less than 600 nl—to be highly reproducibly metered and in fact aliquoted (i.e. repeatedly dispensed from a volumetrically larger dosage-liquid quantity received in the receiving space of the pipette tip) without aspirating dosage liquid between individual dispensing operations. To clarify the terminology used in the present Application: "aliquoting" always encompasses a plurality of dispensing operations, i.e. exactly one for each dosage-liquid quantity delivered during aliquoting.

In contrast to pulsed dispensing, with conventional dispensing the dosage liquid received using the pipetting apparatus is discharged, by elevating the pressure in the working gas, either until a droplet detaches from the pipetting opening in response to gravity, or until dosage liquid is metered through the pipetting opening onto a substrate wetted by the dosage liquid or into a liquid that is already present, from which the pipetting opening is lifted off after delivery of the predetermined dispensed quantity. With conventional quasi-synchronous dispensing, dosage liquid usually moves through the pipetting opening in a dispensing direction only as long as the pipetting piston is also being moved in a dispensing direction (so as to elevate the pressure in the working gas).

Thus, while in conventional dispensing the pressure modification in the working gas, and therefore the motion of a pipetting piston, occur synchronously or quasi-synchronously with the delivery of dosage liquid through a pipetting opening of the pipetting apparatus, the pulsed dispensing on which the present invention is based is asynchronous in this regard, i.e. upon pulsed, abrupt generation of a positive-pressure pulse in the working gas, the droplet of dosage liquid as a rule is not ejected from the received dosage-liquid quantity until the positive-pressure pulse at least is about to decay or has in fact decayed. Delivery of the dosage-liquid droplet thus does not occur synchronously with a motion of the pipetting piston. In pulsed dispensing the dosage-liquid droplet moves in a dispensing direction while the pipetting piston is moving in aspirating fashion (decreasing the pressure in the working gas) or is already again at a standstill.

The speed at which the pipetting piston must be moved for pulsed dispensing depends on the nature of the dosage liquid to be dispensed, for instance its viscosity and/or its specific gravity and/or surface tension. Very generally, a target pipetting-piston position curve can be ascertained a priori for different dosage liquids or categories of dosage liquid and for different quantities to be metered, and stored retrievably in a data memory of the pipetting apparatus.

In pulsed dispensing, the quantities of liquid to be metered are delivered as droplets from the dosage-liquid quantity that is received in the pipetting apparatus, as a rule with an acceleration that, in a context of dispensing in the effective direction of gravity, is added to the acceleration of gravity. This means that in a context of pulsed dispensing by the pipetting apparatus, dosage-liquid droplets detached from the received dosage-liquid quantity move away from the pipetting apparatus upon dispensing, in the direction of gravity, faster than merely in free fall. Large quantities of dosage liquid, i.e. quantities greater than 2 µl, as a rule are pipetted in a synchronous (also referred to in the present Application as "conventional") operating mode of the pipetting apparatus, in which the dosage liquid in the pipette tip, more precisely its meniscus facing toward the piston, synchronously follows the motion of the pipetting-opening-side or metering-side end surface of the piston. This means that when the meniscus is moved in a dispensing direction constituting a pipetting direction, it moves in a dispensing direction together with the metering-side end surface of the piston; and when the piston is moved in an aspiration direction constituting a pipetting direction, it moves in an aspiration direction together with the metering-side end surface of the piston. A slight time offset can occur between the motion of the metering-side end surface of the piston and the piston-proximal meniscus of the dosage liquid, since in order to overcome frictional, capillary, adhesive, cohesive, and/or surface effects, the working gas present between the piston and the dosage liquid must firstly be brought by the piston motion to a pressure level at which the desired pipetting operation can proceed. Upon aspiration, this is a negative pressure with respect to ambient pressure, so that dosage liquid, driven by the pressure difference between the pressure of the working gas and ambient pressure, flows into the pipette tip from a dosage-liquid reservoir into which the pipetting opening of the pipette tip is immersed. Upon dispensing, it is a positive pressure with respect to ambient pressure, so that dosage liquid received in the pipette tip, driven by the pressure difference between the pressure of the working gas and ambient pressure, emerges through the pipetting opening of the pipette tip. The compressible working gas thus acts as a gas spring. Because of the small but real time offset between the piston motion and the motion of the meniscus of the dosage liquid in the pipette tip, conventional pipetting of dosage liquid will be referred to hereinafter as a "quasi-synchronous" operating mode.

In conventional dispensing, with quasi-synchronous motion of the piston and dosage liquid, detachment from the pipette tip of the dosage liquid being dispensed is brought about using inertial forces of the dosage liquid. The piston is moved in a dispensing direction for a predetermined time, and is halted as abruptly as possible when a detachment of dosage liquid displaced out of the pipette tip is desired. The inertia of the already-displaced dosage liquid, which is still in the course of a dispensing motion because of the previous piston motion, can then result in constriction of the dosage liquid at the pipette opening and ultimately in detachment thereof. In conventional dispensing, the correlation between piston motion and dosage liquid displaced by way of the working gas is usually ascertained empirically for various categories of liquid, and stored in a data memory of the pipetting apparatus. In this quasi-synchronous operating mode, the volume (generally the pipetting volume or the aspirated volume or dispensed volume, depending on the motion direction of the piston) swept out by the dispensing-side piston surface during the piston's motion in a pipetting direction as a rule exceeds the volume of dosage liquid that is actually pipetted by no more than 5%. The ratio of pipetted volume to the volume of dosage liquid that is actually pipetted is therefore usually no greater than 1.05.

As a result of the inertia-induced liquid detachment at the pipetting opening, dosage liquid on occasion remains undesirably adhering externally to the pipette tip in the region of the pipetting opening. In order to prevent this adhering quantity of liquid from dripping off in entirely or partly uncontrolled fashion, the piston is moved a little way in an aspiration direction after the liquid has detached, in order to draw the externally adhering dosage liquid through the pipetting opening back into the pipette tip.

Depending on the particular dosage liquid, this dispensing of dosage liquid utilizing inertial forces of the dispensing action no longer functions reliably for individual metered volumes of less than 3 to 5 µl, since the achievable inertial forces can then, because of the small mass, no longer sufficiently reliably overcome other influencing forces, in particular due to surface tension, in order to guarantee reliable, reproducible detachment of such small quantities of dosage liquid.

A distinction is to be made between the pipetting apparatuses described here and so-called "dispensers," which as a rule can exclusively dispense dosage liquids but cannot aspirate them. Dispensers, as a rule, obtain the dosage liquid for dispensing via delivery conduits from a reservoir that is flow-capably connected to a metering space, modifiable by way of the piston, of the dispenser.

Also to be distinguished from the pipetting apparatuses recited above are pipetting apparatuses in which the metering-side end surface of the piston is directly in contact with the dosage liquid to be pipetted. There is then no working gas present between the piston and the dosage liquid.

Because of the direct motion coupling between the piston and dosage liquid in such working-gas-free pipetting apparatuses, this type of pipetting is referred to among specialists as "positive displacement." The omission of compressible working gas increases the theoretically achievable pipetting accuracy, but in practice leads to difficulties elsewhere. On the one hand, inclusion of gas in the pipetted volume upon aspiration cannot be ruled out with absolute certainty, so that bubbles of gas or air can occur in the aspirated dosage liquid even with positive displacement pipetting; this has a disadvantageous effect on the achievable pipetting accuracy because of the deviation from the target state. On the other hand, the pipetting accuracy achievable with positive displacement pipetting is extremely low when the dosage liquid has a tendency to foam. In addition, because the pipetting piston is wetted by the dosage liquid, when the dosage liquid to be pipetted is to be changed it is necessary to replace not just a pipette tip but the pipetting piston along with it, signifying a considerable installation outlay and consequently considerable costs.

In contrast thereto, the pipetting procedure used by pipetting apparatuses of the species, with a working gas between the piston and the dosage liquid, is referred to among specialists as "air displacement," even though the working gas does not necessarily need to be air but can also be an inert gas or quasi-inert gas such as nitrogen. With this type of pipetting, the pipetting piston is permanently and completely separated from the dosage liquid by a column of gas, in particular a column of air. The risk of contamination is therefore nonexistent or negligible.

The present pipetting apparatus according to the present invention is also to be distinguished from those which use a column of a system liquid as a piston. A certain risk of contamination is associated with such system liquids, since at times it is not possible to exclude the possibility of system liquid, i.e. a portion of a "liquid column," getting into the dosage liquid being pipetted. The piston of the pipetting apparatus of the present invention is embodied at least locally, preferably entirely, as a solid body in order to avoid a risk of contamination. In the case of an embodiment only locally as a solid body, at least the metering-side end surface of the piston, facing toward the dosage liquid of the column, is embodied as a solid body in order to prevent a liquid-to-liquid transfer.

With pulsed dispensing of small amounts of dosage liquid, undesired accompanying phenomena can occur depending on the dosage liquid that is selected, for example depending on its viscosity, specific gravity, and/or surface tension, and furthermore depending on the parameters of the positive-pressure pulse and possibly of the subsequent negative-pressure pulse. For example, instead of a single desired metered droplet at the pipetting-opening-proximal delivering meniscus, a mist of dispensed liquid or a delivery of dosage liquid by way of a metered droplet accompanied by undesired satellite droplets can occur; this is associated with an undesired decrease in the achievable accuracy in terms of metered quantity.

"Dispensing" is therefore understood for purposes of the present Application as spray- and mist-free delivery of the dosage liquid, in one droplet.

In principle, the pipetting apparatus can comprise a permanently installed pipetting conduit having a pipette tip, with a pipetting opening, embodied at the end of the pipetting conduit. This is less advantageous for hygienic reasons, however. Preferably, the pipetting apparatus is embodied for attachment of replaceable pipette tips to the pipetting conduit. Provision is correspondingly made, in accordance with an advantageous refinement of the present invention, that the pipetting apparatus comprises a coupling configuration, penetrated by the pipetting conduit, for temporary attachment of a pipette tip. When a pipette tip is attached to the coupling configuration, the pipette tip extends the apparatus-inherent pipetting conduit and is temporarily, i.e. while it is attached, part of the pipetting conduit of the pipetting apparatus. In order to decrease contamination risks, the pipette tip is preferably a disposable or single-use pipette tip that is discarded after a single use for dispensing or aliquoting.

The pipetting apparatus is preferably embodied not only for pulsed dispensing but also for conventional aspiration, in which the dosage liquid follows the piston motion in, and initially into, the receiving space synchronously or quasi-synchronously in the sense explained above. Dosage liquid can then be furnished in the pipetting apparatus, in particular in a pipette tip received thereon, by quasi-synchronous aspiration of dosage liquid through the pipetting opening of the pipetting apparatus into the receiving space of the pipetting apparatus.

The pipetting apparatus is preferably embodied both for pulsed dispensing in an asynchronous mode and for conventional dispensing in a quasi-synchronous mode, so that small quantities of dosage liquid (less than 2 µl, for example as little as a few tens of nanoliters), as well as large quantities of liquid (several hundred microliters) are reproducibly dispensable using the pipetting apparatus according to the present invention. The switchover between asynchronous and quasi-synchronous operation is effected by corresponding application of control to the pipetting-piston motion drive system by the control apparatus. The control apparatus can furthermore be embodied to regulate, only in the pulsed pipetting mode, the application of control to the motion drive system in accordance with the position signal outputted by the position detection apparatus. In the conventional pipetting mode, because of the close correlation between the volume swept out by the piston and the dispensed or aspirated volume, the control apparatus can continue to apply control to the motion drive system in position-dependent fashion in accordance with a signal of at least one position sensor which indicates the position of the pipetting piston, and can thereby regulate the piston position. Additionally or alternatively, in the conventional pipetting mode the control apparatus can apply control to the motion drive system in accordance with a pressure signal representing the pressure of the working gas. If the piston acceleration and piston motion are sufficiently slow, both dispensing and aspiration occur quasi-synchronously. The values to be established by the control apparatus at the motion drive system for a desired piston acceleration and/or piston speed can be ascertained without great effort, by experiment, for different categories of liquid.

For example, for implementation of a quasi-synchronous pipetting mode the control apparatus can be embodied to move the piston at a maximum speed of no more than 1000 µl/s for pipetting a predetermined individual metered volume of more than 2 µl. At the indicated maximum piston speed of no more than 1000 µl/s, the dosage liquid follows the piston in a co-directional motion (possibly with a slight offset in time). As stated above, the pipetting volume swept out by the piston corresponds substantially to the volume of dosage liquid that is actually pipetted. The piston sizes (indicated by the piston area) recited below in the present Application preferably apply.

With the capability of operating the pipetting apparatus according to the present invention both in a synchronous (or quasi-synchronous) and in an asynchronous pulsed pipetting mode, one and the same pipetting apparatus according to the present invention can be embodied to reproducibly pipette a selectable individual metered volume in a metered volume range from 100 nl to 100 µl, preferably from 100 nl to 1000 µl, with a volume deviation of no more than 2% with reference to the predetermined individual metered volume constituting a nominal volume. The pipetting apparatus according to the present invention is thus capable of pipetting a maximum pipetting volume that is 10,000 times the minimum pipetting volume. The possibility of going even below the aforesaid lower limit of 100 nl is, of course, not to be excluded. The functionality of the pipetting apparatus is ensured in any event for the aforesaid pipetting volume ranges.

For the reasons recited, it is advantageous if the pipetting apparatus comprises a detachable pipette tip having a counterpart coupling configuration for detachable coupling engagement with the coupling configuration and with the pipetting opening constituting a pass-through opening for dosage liquid during an aspiration operation and during a dispensing operation. In this case the dosage liquid is furnished in the pipette tip, if applicable after an aspiration operation. Because of the large dosage-liquid quantity received in this context, the aspiration operation is preferably effected not in pulsed fashion but as a quasi-synchronous aspiration operation, i.e. the generation of an aspirating negative pressure in the working gas, and an inflow, caused thereby, of dosage liquid through the pipetting opening into the pipetting apparatus or into the pipette tip, very largely overlap in time.

One of the great advantages of the pipetting apparatus according to the present invention, and of the pulsed dispensing operation, is that it is possible to use a standard pipette tip having a nominal pipetting-space volume that is substantially larger than the dosage-liquid dose delivered in the context of a single pulsed dispensing operation. The nominal received volume or nominal pipetting-space volume of the pipette tip is preferably more than 80 times, particularly preferably more than 300 times, highly preferably more than 500 times the minimum possible volume of a single liquid dose that is dispensed or dispensable in pulsed fashion. Aliquoting operations involving numerous successive pulsed dispensing actions can thereby be achieved with a very highly reproducible dose volume without intervening aspiration.

In an experiment, for example, a standard pipette tip having a nominal received volume of 300 μl was temporarily attached to a pipetting apparatus. Into this pipette tip, 40 μl of a dosage liquid, for example glycerol, was synchronously aspirated. A gas volume of 4 to 5 μl—a gas volume that is generally advantageous, but not obligatorily necessary, for the pipetting apparatus according to the present invention—was provided between the pipetting opening and the pipetting-opening-proximal delivering meniscus. In this configuration, glycerol (constituting a dosage liquid) was aliquoted 20 times in succession in pulsed fashion at an individual metered volume of 448 nl, in which context the individual delivered metered volumes differed by no more than 2.96%.

Repeated delivery of glycerol, constituting a comparatively viscous liquid, at a reproducible metered volume of less than 450 nl from a 40-μl reservoir furnished in the pipetting apparatus, is highly unusual.

In physical terms, it is possible to achieve pulsed pressure changes in the working gas in simple and highly accurate fashion because the pipetting piston is a magnetic piston having at least one permanent magnet, and because the motion drive system comprises electrically energizable coils. The control apparatus can then be embodied to control the supply of electrical energy to the coils. The magnetic piston is preferably a solid-state piston preferably having a plurality of solid-state permanent magnets that are sufficiently sealed, for example by a corresponding cap, at least at their longitudinal end located closer to the pipetting opening with respect to the pipetting conduit that receives the piston. This cap can surround one or several solid-state permanent magnets of the pipetting piston. The provision of a magnetic piston that is drivable by an electromagnetic field in the manner of a linear motor makes possible highly dynamic whiplash-like motion processes of the piston in the pipetting conduit, and thus enables the generation of positive-pressure pulses of very short duration whose effect can be abruptly stopped by way of negative-pressure pulses also of short duration.

The aforesaid generation of a negative pressure then encompasses a displacement of the magnetic piston in a first direction, as a rule a direction away from the pipetting opening.

Generation of the positive-pressure component in the pressure pulse also encompasses a displacement of the piston in a second direction opposite to the first.

Preferably only the working gas, and no further system fluid or metering fluid, is present between the pipetting piston and the dosage-liquid quantity furnished in the pipetting conduit.

In principle, when a pipetting piston that has at least one permanent magnet and is movable in linear-motor fashion by way of energizable coils is used, the position of the pipetting piston in the pipetting conduit can be ascertained based on the inductive feedback of the permanently magnetic pipetting piston into the coils by way of the linear-motor motion drive system. The linear-motor motion drive system itself can thus be the position detection apparatus or at least a portion thereof. For maximally high-resolution, and therefore particularly accurate, detection of the pipetting-piston position, the position detection apparatus can additionally or alternatively comprise at least one position sensor that is embodied to detect the position of the pipetting piston and to output to the control apparatus a position signal indicating the detected piston position. If the pipetting piston is a permanently magnetic piston, a plurality of Hall sensors can preferably be used as position sensors that are arranged along the pipetting conduit. Other position sensors can, however, also be used.

For highly accurate pulsed modification of the pressure of the working gas during a pipetting operation, the control apparatus can control the supply of electrical energy to the coils in the form of regulation depending on a detected instantaneous state of the supply of electrical energy to the coils, and depending on the position signal of the position detection apparatus or of the at least one position sensor.

The pipetting-piston motion duration of 35 ms, indicated above, is only an upper limit. The duration can also be considerably shorter than 35 ms, for instance 15 ms, 10 ms, 5 ms, or even only 1 ms, depending on the desired quantity to be metered and depending on the dosage liquid. In order to achieve the desired high metering accuracy in the necessarily short time that is available for pulsed modification of the pressure of the working gas, according to a particularly advantageous refinement of the present invention the control apparatus encompasses a cascaded control-loop structure having at least two control loops. The control apparatus can then be embodied to establish, in an internal control loop of the cascaded control-loop structure, an electrical voltage applied to the coils in accordance with a difference between a target current value and a detected current value of a current flowing in the coils.

The control apparatus can then be further embodied to establish the target current value of the current flowing in the coils, in an externally located control loop of the cascaded control-loop structure, in accordance with a difference between a target position value and an actual position value, indicated by the position signal, of the pipetting piston.

Several interference variables can furthermore be quickly and reliably compensated for by way of the cascaded regulation of the piston motion: the external control loop, which ascertains a target coil-current value in accordance with a difference between the target and actual positions of the pipetting piston, can equalize or at least decrease unpredictable frictional influences that vary individually for different pipetting apparatuses and operating procedures, for instance friction between the piston seal and pipetting-conduit cylinder.

The internal control loop, which ascertains a target voltage value in accordance with a difference between the target and actual current values of the current flowing in the coils, can equalize or at least decrease unpredictable fluctuations, which vary individually for different pipetting apparatuses and operating procedures, in coil resistance values and coil inductance values.

For highly accurate and very rapid modification of the working gas pressure with particularly short pressure pulses, for instance (but not only) in the single-digit millisecond range, it is further advantageous if the control apparatus encompasses a data memory in which at least one predetermined target pipetting-piston position curve is stored for pilot control. To further increase metering accuracy, a predetermined target coil-current curve that brings about the predetermined target pipetting-piston position curve can additionally be stored in the data memory for pilot control.

The control device is preferably embodied for pilot control of the control loops in the cascaded control-loop structure in accordance with the target pipetting-piston position and the target coil current. The predetermined curves can be ascertained empirically for different liquids or categories of liquids. A "curve" is considered to be a chronological sequence of at least three parameter values. Instead of absolute parameter values, the curve can also contain difference values (delta values) for those parameter values, which are applicable to a reference state, for example a standard atmosphere (e.g. 20° C. at an atmospheric pressure of 1013.24 hPa). The predetermined curves can thereby be meteorologically compensated.

Additionally or alternatively, a predetermined curve can also be stored in the form of a mathematical function or function family. A value that has not been directly ascertained empirically can preferably be obtained by interpolation or extrapolation based on the function.

As already stated above, a plurality of predetermined target pipetting-piston position curves can be stored in the data memory. From them, depending at least on the dosage liquid and on the quantity of liquid to be pipetted, one target pipetting-piston position curve can be selectable as an active predetermined target pipetting-piston position curve for the respective pipetting operation. The selection can be made by manual input or by data transfer between networked laboratory devices. It can be made, with regard to the dosage liquid, automatically by the pipetting apparatus and by its control apparatus, for instance because the pipetting apparatus is embodied to independently recognize the dosage liquid or category of dosage liquid. In a simple case this can be accomplished by reading a corresponding code such as a barcode, or by analytical metering in order to recognize dosage liquids or categories of dosage liquids, if necessary utilizing further sensors.

As a result of the physical effects that are relevant to pulsed pipetting, the pipette tip does not become completely emptied in the context of a pulsed dispensing action. Dosage liquid remains in the receiving space of the pipette tip even after the pulsed dispensing operation. Pulsed dispensing of dosage liquid therefore preferably takes place out of a dosage-liquid quantity, received in the receiving space of the pipette tip, whose volume is at least five times greater than the volume of the dosage liquid to be dispensed in pulsed fashion.

The pipetting apparatus is embodied for pulsed dispensing in a jet mode in which the dispensed liquid volume travels a certain distance in free flight between the delivering dosage-liquid quantity in the pipette tip and a dispensing destination.

The whip-like movability of the piston which is typical of pulsed pipetting is preferably implemented by the fact that the control device is embodied to operate the motion drive system, for dispensing of a predetermined individual metered volume of less than 2 µl, in such a way that the piston is moved in a dispensing direction and in that context its metering-side end surface sweeps out a dispensed volume that is no less than 1.4 times greater than the individual metered volume; and that the piston is then moved in an aspiration direction opposite to the dispensing direction, and in that context its metering-side end surface sweeps out an aspiration volume; the motion of the pipetting piston lasting in total no longer than 35 ms, preferably no longer than 25 ms.

The motion of the piston can be detected on the basis of any reference point on the piston, for instance based on the metering-side piston surface.

The effect of the motion sequence of the piston, as proposed according to the present invention, on the dosage liquid has not yet been entirely clarified. One explanatory model assumes, however, that with the pulsed motion of the piston in a pipetting direction, preferably a dispensing direction, in excess of the predetermined individual metered volume that is to be pipetted, the excitation energy or breakaway energy necessary to initiate motion of the dosage liquid in the desired dispensing direction against inertial forces, surface tension, adhesion, and cohesion thereof, becomes transferred to the dosage liquid that is to be pipetted.

With the motion of the piston in the counter-pipetting direction (preferably aspiration direction) opposite to the pipetting direction (preferably dispensing direction), in which motion the piston again as a rule sweeps out a volume that as a rule is different from, preferably once again greater than, the individual metered volume that is actually to be pipetted, the previously excited pipetting motion (preferably dispensing motion) of the dosage liquid becomes "de-excited." Depending on the extent of the necessary de-excitation, the aforementioned two motion phases are sufficient or three motion phases are required.

A very short, sharp pressure pulse is thus transferred, by motion of the pipetting piston in accordance with a pre-defined curve of pipetting-piston positions over the pipetting time, from the piston via the working gas to the dosage liquid. The precision with which the actual pipetting-piston position curve follows the target pipetting-piston position curve depends on the regulation quality. Good results have been achieved in this context with the aforementioned cascaded regulation system, even for short pressure pulses, on the basis of several parameters, preferably with pilot control of the parameters.

Surprisingly, the volumes (dispensed volume and aspirated volume) swept out by the piston in the course of its motion can be identical in size. The piston can therefore be located back in the starting position at the end of the dispensing operation even though an individual metered volume is pipetted.

A "displacement gain" for the piston is therefore not of importance according to the present invention. Experiments have instead shown that the dosage-liquid volume that is actually dispensed depends on the target piston motion integrated over time.

On the reasonable assumption that the shape of the metering-side end surface of the piston does not change during pipetting, the volume swept out by the piston or by its metering-side end surface is the planar area of the projection of the metering-side end surface of the pipetting piston onto a projection plane orthogonal to the conduit path, multiplied by the piston stroke length.

The term "dispensing direction" refers to a motion direction of the piston which brings about an ejection of dosage liquid from the dosage-liquid receiving space of the pipette tip. The term "aspiration direction" refers to a motion direction of the piston which causes dosage liquid to be drawn into the dosage-liquid receiving space of the pipette tip.

For purposes of the present invention, an "individual metered volume" is predetermined whenever the dispensing operation proceeds with the objective of dispensing a specific known metered volume. The individual metered volume can be predetermined by manual input into the pipetting apparatus; or by data transfer to the pipetting apparatus; or by calculation from manually inputted data, and/or data stored in a memory apparatus, for the pipetting apparatus.

The dispensed volume initially swept out by the metering-side end surface of the piston can depend not only on the predetermined individual metered volume, but additionally on parameters of the respective dosage liquid to be pipetted and/or on the volume of working gas between the metering-side piston surface and the dosage liquid. The principle is as follows: the higher the viscosity of the dosage liquid (measured at a room temperature of 20° C. at an atmospheric pressure of 1013.25 hPa using a rotational viscometer), the higher the ratio between the dispensed volume and the individual metered volume. The following also applies: the greater the volume of the working gas, the higher the ratio of dispensed volume to individual metered volume. In the context of the preferred replaceable pipette tips, a design-governed working-gas volume between the piston and the metered volume usually cannot be less than 100 µl and cannot exceed 3000 µl. The working-gas volume is preferably between 180 µl and 1000 µl, particularly preferably between 200 µl and 800 µl.

For example, the dispensed volume can be not less than 1.4 times the individual metered volume. It can, however, also be appreciably larger than 1.4 times the individual dispensed volume. It can be equal, for example, to five times the individual metered volume if a low excitation energy is sufficient to accelerate the dosage liquid to flow through the (as a rule, narrow) pipetting opening. Dosage liquids that are less readily excited to move can be excited to move using a piston motion in a dispensing direction, and a dispensed volume swept out in that context by the metering-side end surface, which are equal to no less than ten times the individual metered volume. Because the piston motion is executed preferably at a higher maximum volumetric speed than the volume swept out per unit time by the metering-side end surface, the reproducibility for pipetting very small individual metered volumes (less than 2 µl) rises with increasing dispensed volume. The dispensed volume can therefore preferably be equal to no less than twenty-five times the individual metered volume.

Experiments have shown that in particular for the category of "aqueous liquids" that often need to be pipetted—i.e., for purposes of the present Application, liquids having a viscosity in the range from 0.8 to 10 mPas, measured at a room temperature of 20° at an atmospheric pressure of 1013.25 hPa using a rotational viscometer—a dispensed volume of between ten times and sixty times, preferably between ten times and twenty-five times, the individual metered volume produces outstanding metering results. A dispensed volume of between ten times and twenty-five times the individual metered volume also produces outstanding metering results for dosage liquids outside the aforementioned viscosity range.

An upper limit on the dispensed volume is represented by a dispensed volume at which more than the individual metered volume becomes moved through the pipetting opening because of the long time span required by the piston to sweep out the dispensed volume with its metering-side end surface. Tests have shown that dispensed volumes of more than 500 times the individual dispensed volume no longer permit useful dispensing of metered volumes of less than 2 µl.

The absolute value of the maximum pressure difference between the working-gas pressure during the phase of the positive-pressure component and the reference pressure immediately before onset of the pipetting-piston motion in the context of a pipetting operation is preferably less than 50,000 Pa, particularly preferably less than 25,000 Pa, and highly preferably less than 10,000 Pa. These values apply to a plurality of different liquids and categories of liquids. For the particularly relevant category of the aqueous liquids as defined in this Application, the absolute value of the maximum pressure difference between the working-gas pressure in the positive-pressure phase and the reference pressure is preferably less than 2200 Pa and particularly preferably less than 1800 Pa.

The absolute value of the maximum pressure difference between the working-gas pressure in the phase of the positive-pressure component and the reference pressure is preferably greater than 500 Pa, by preference greater than 600 Pa.

The absolute value of the maximum pressure difference between the working-gas pressure during the phase of the negative-pressure component and the reference pressure immediately before pipetting-piston motion begins in the context of the pipetting operation is preferably less than 30,000 Pa, particularly preferably less than 15,000 Pa, and highly preferably less than 7500 Pa.

The absolute value of the maximum pressure difference between the working-gas pressure during the phase of the negative-pressure component and the reference pressure is preferably greater than 200 Pa, by preference greater than 400 Pa.

The maximum pressure difference values occurring during a dispensing pressure pulse with respect to the reference pressure from which the pressure pulse proceeds depends on a not yet conclusively determined plurality of parameters, for instance the individual metered volume to be dispensed, and on the liquid, which can be characterized by specific gravity, viscosity, and surface tension. It is apparent, for example, that for a given liquid, both the absolute value of the maximum pressure difference with respect to the reference pressure in the positive-pressure phase and the absolute value of the maximum pressure difference with respect to the reference pressure in the negative-pressure phase decrease with increasing individual metered volume.

Be it noted for clarification at this juncture that despite the above-described large piston motion in the context of dispensing, the pipetting apparatus embodied according to the present invention moves only the predetermined individual metered volume of dosage liquid through its pipetting opening. Over-metering or over-dispensing, with subsequent correction in an aspiration direction, does not take place. According to the present invention, dosage liquid is moved only in the desired dispensing direction during a dispensing operation. For purposes of the present Application, a dispensing operation is complete when piston motion ends.

The aspirated volume swept out by the piston during its motion can be identical to the dispensed volume in the context of aliquoting as well. In aliquoting mode, however, with an increasing number of dispensing operations the pipetting-opening-proximal meniscus can migrate farther and farther into a dosage-liquid receiving space of the pipetting apparatus, which can be detrimental to the accuracy of further dispensing operations.

The aspirated volume can therefore be less than the dispensed volume by an amount equal to the individual metered volume, or a piston motion in an aspiration direction can be followed by a correcting piston motion in a dispensing direction, for example constituting the aforementioned third motion phase. This third motion phase is then the shortest in time of the three aforesaid motion phases. It is thereby possible to ensure that the pipetting-openingproximal meniscus of received dosage liquid remains in a maximally constant location even though several dispensing operations have been carried out. In accordance with the information provided previously, the aspirated volume can thus also be substantially larger than the individual metered volume.

The correct dispensed volume and aspirated volume to be swept out by the piston for a dispensing operation for dispensing small dosage-liquid quantities can easily be determined for a dosage liquid by experiments using a defined individual metered volume.

In the asynchronous pipetting mode that is described here, motions of the piston on the one hand and of the dosage liquid on the other hand which are directed oppositely to one another can occur at one and the same point in time or within one and the same time span. A motion of dosage liquid through the pipetting opening can also in fact begin only after the piston has completed its motion and has come back to a standstill. Because of its preferred construction using permanently magnetic pistons drivable in linear-motor fashion, however, the pipetting apparatus according to the present invention is additionally embodied for conventional quasi-synchronous dispensing operation and for conventional quasi-synchronous aspiration operation.

Regardless of when the individual metered volume of dosage liquid begins to move through the pipetting opening in the context of a pulsed dispensing operation, most dispensing operations nevertheless have in common the fact that control is applied to the piston to reverse its direction of motion (and as a rule the direction of motion of the piston in fact becomes reversed) before the predetermined liquid volume has detached from the pipetting opening.

The whip-like movability of the piston for pulsed pipetting can consequently be brought about by the fact that the motion drive system encompasses a linear motor; and that for pipetting a predetermined individual metered volume of less than 2 µl, the control device and the motion drive system are embodied to move the piston at a peak speed of at least 5000 µl/s, preferably at least 10,000 µl/s, and no more than 25,000 µl/s.

The volumetric speed of the piston, i.e. the volume swept out by the metering-side end surface of the piston per unit time, is more important for pulsed pipetting than the linear motion speed of the piston or of a piston rod. For pistons having a larger piston area, a shorter stroke length is sufficient to sweep out the same volume for which a piston having a smaller piston area would require a longer stroke length. In order to achieve increasing volumetric speeds, a piston having a larger piston area, rather than a piston having a smaller piston area, could therefore simply be moved along the conduit path. The breakaway force required to initiate motion of the piston, for example in order to overcome static friction, rises considerably with piston size, however, so that pistons having an increasingly large piston area are increasingly difficult to control for the dispensing of individual metered volumes of less than 2 µl.

The present invention preferably relates to pipetting apparatuses whose pistons have a piston area of between 3 and 80 mm², i.e. have a diameter of between 2 and approximately 10 mm assuming a circular piston surface. In order to allow several pipetting conduits to be arranged in a row-and-column grid with the smallest possible grid spacing, the present invention particularly preferably relates to pipetting apparatuses whose pistons have a piston area of between 3 and 20 mm², corresponding to a diameter of between 2 and approximately 5 mm assuming a circular piston surface.

The pipetting apparatus preferably comprises a plurality of pipetting conduits, a pipetting piston embodied as described above being received, movably along the pipetting-conduit axis, in each of them. In addition, each pipetting conduit can comprise a respective coil arrangement that is energizable by the control apparatus and that forms, with the magnetic pipetting piston, a linear motor for driving the pipetting piston.

Although dispensing at excessively high maximum piston speeds of, for example, more than 25,000 µl/s does still result in a motion of liquid out of a dosage-liquid receiving space, the individual metered volume is then as a rule delivered as multiple broken-up sub-volumes (satellite droplets) or in atomized fashion, which is unacceptable for highly accurate dispensing of the small individual metered volumes of less than 2 µl under discussion here. In principle, it can be established that with increasing piston speed and/or piston acceleration, there is an increasing tendency for the predetermined dosage-liquid quantity to be undesirably pipetted in multiple sub-quantities. As presently understood, at least for aqueous dosage liquids as defined above, quite outstanding results in terms of the accuracy and repeatability of the pipetted liquid quantity are achieved at maximum piston speeds of approximately 10,000 µl/s. A preferred maximum piston speed during a pulsed pipetting operation is therefore in the range from 7000 to 13,000 µl/s.

In order to give an impression of the piston speed: the piston preferably requires less than 18 ms for its motion in a dispensing direction and then in an aspiration direction from the half-travel distance location (half the distance between the initial location of the pipetting piston and its first reversing dead-center point in the context of a whip-like pipetting motion to generate a pressure pulse in the working gas) and then back to that half-travel distance. Motion times in the single-digit millisecond range can in fact be achieved.

For a dispensed volume of 30 µl swept out by the metering-side end surface and a swept-out aspiration volume of 29.05 µl, and using a piston having a circular piston surface and a diameter of 4.3 mm, one complete piston motion in a dispensing direction and aspiration direction, with which an individual metered volume of 950 nl of an aqueous dosage liquid is dispensed, can easily occur in approximately 15 ms.

The kinematic aspect of the whip-like piston motion is based, however, not only on the maximum achievable piston speed but also on the length of time required by the motion drive system to accelerate the piston to and/or decelerate it from the desired piston speed. The control device and the motion drive system are therefore preferably embodied to accelerate and/or decelerate the piston for motion along the conduit path with an acceleration of at least $2 \times 10^6$ µl/s², preferably at least $6 \times 10^6$ µl/s², particularly preferably in fact at least $8 \times 10^6$ µl/s², and no more than $1 \times 10^8$ µl/s². The statements made above regarding preferred piston size, indicated as piston area, apply here.

Entirely surprisingly, it has furthermore been found that the pipetting of dosage liquids, in particular of aqueous dosage liquids, using the pipetting apparatuses according to the present invention which are proposed here, is independent of the particular pipette tip used. With identical pipetting parameters and for a given dosage liquid in a given pipetting apparatus, the same pipetting result is always repeatably achieved using different pipette tips. In particular, the pipetting result is independent of the nominal receiving-space volume of the particular pipette tip attached to the pipetting apparatus. The pipetting result achievable with a set of pipetting parameters can be transferred that much more effectively between pipette tips having different nominal received-space volumes if the pipette tips have identical pipetting openings and identical dead-space volumes.

BRIEF DESCRIPTION OF THE DRAWINGS

The present invention will be explained in more detail below with reference to the appended drawings, in which.

DETAILED DESCRIPTION

Figure 1:
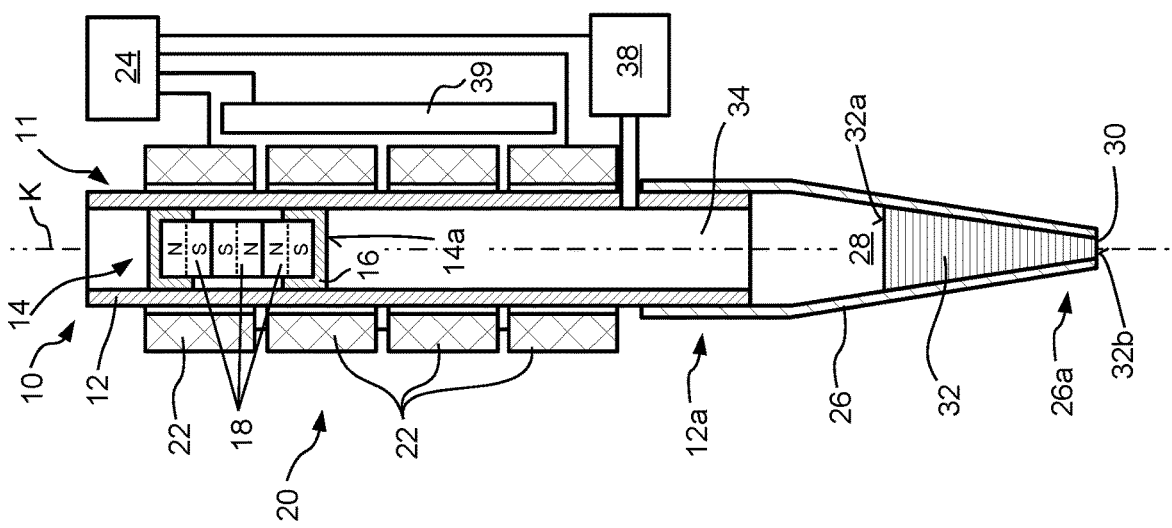
FIG. 1 shows a pipetting apparatus according to the present invention in which a pulsed dispensing method according to the present invention is proceeding, immediately after aspiration of a predetermined quantity of dosage liquid.
Figure 2:
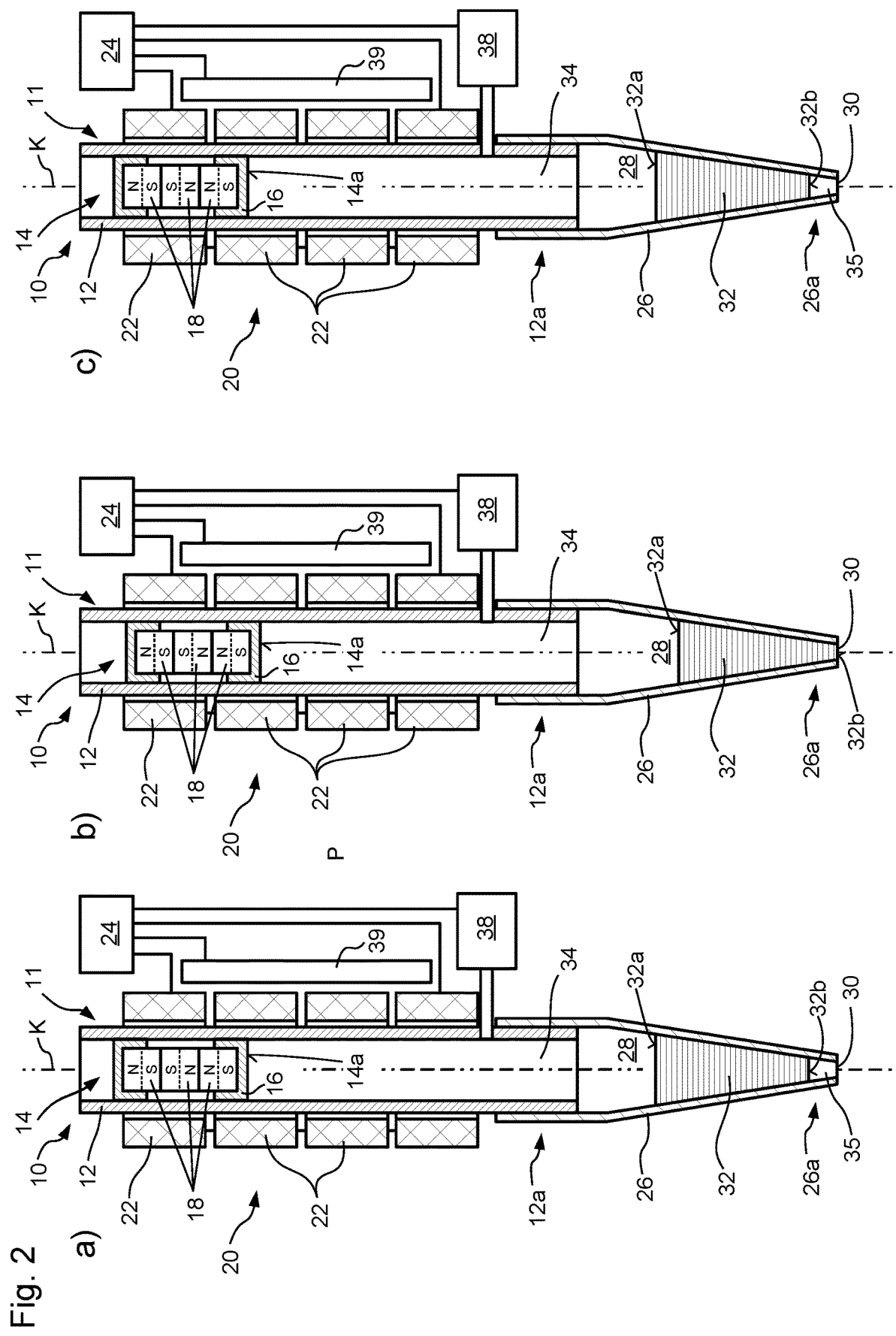
FIG. 2a shows the pipetting apparatus of FIG. 1 after generation of a first negative pressure in the working gas with respect to the reference holding pressure of FIG. 1, in order to form a gas volume between the pipetting opening and the aspirated dosage liquid.
FIG. 2b shows the pipetting apparatus of FIG. 2a after the pressure of the working gas between the pipetting piston and aspirated dosage liquid has been elevated in order to displace the pipetting-opening-proximal meniscus toward the pipetting opening.
FIG. 2c shows the pipetting apparatus of FIG. 2b after generation of a second negative pressure in the working gas with respect to the reference holding pressure of FIG. 1, in order to form a gas volume between the pipetting opening and the aspirated dosage liquid.
Figure 3:
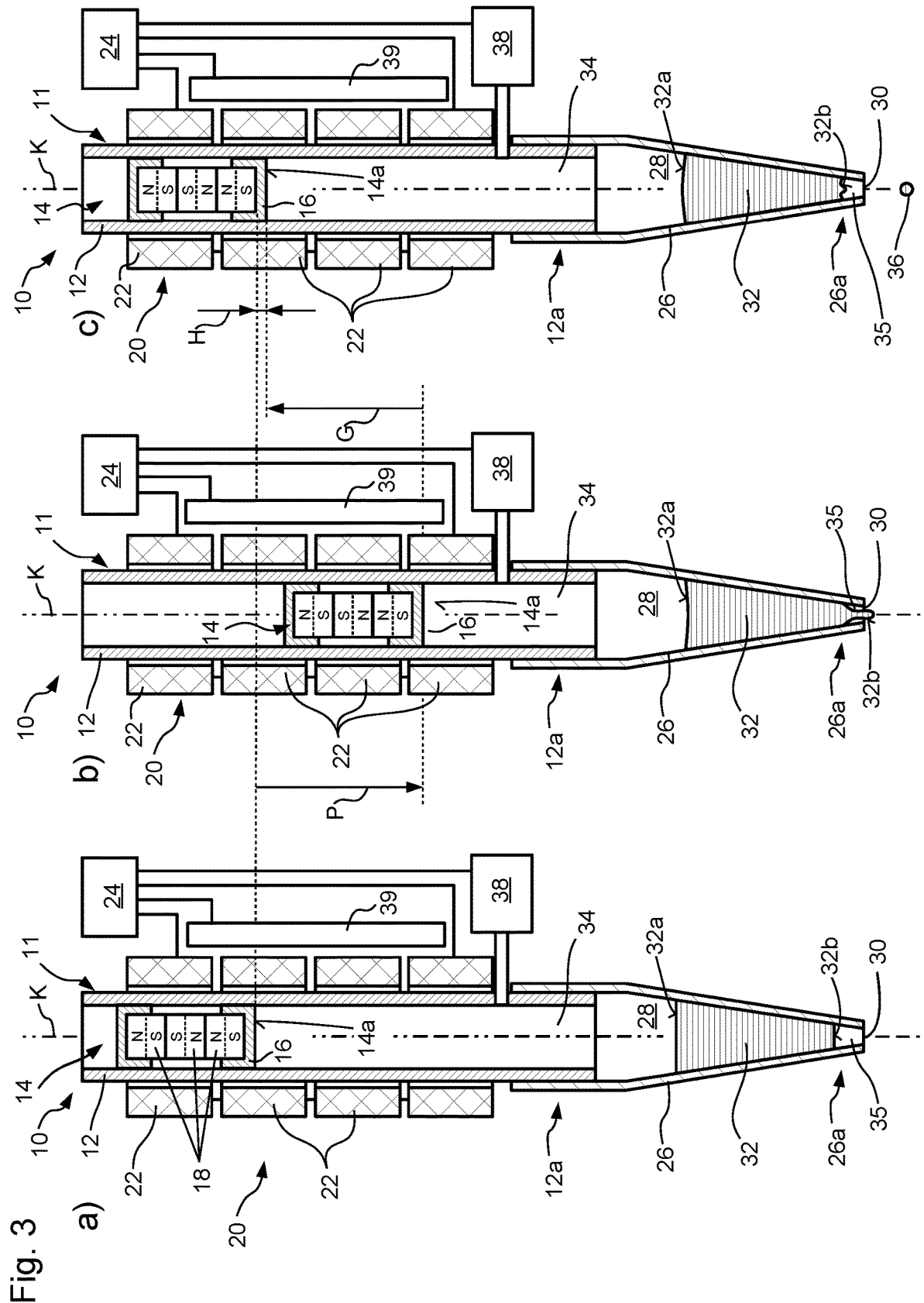
FIG. 3a shows the pipetting apparatus of FIG. 2c, depicted again on the third sheet of drawings merely in the interest of clarity.
FIG. 3b shows the pipetting apparatus of FIG. 3a during abrupt generation of a pressure pulse.
FIG. 3c shows the pipetting apparatus of FIG. 3b after completion of the whip-like piston motion in order to dispense an individual metered volume of 500 nl.

In FIGS. 1 to 3c, a pipetting apparatus according to the present invention is labeled in general with the number 10. Said apparatus encompasses a pipetting conduit 11 encompassing a cylinder 12 that extends along a conduit path K configured as a straight-line conduit axis. A pipetting piston (or simply "piston") 14 is received in this pipetting conduit 11, movably along conduit path K.

Piston 14 encompasses two end caps 16 (only the lower one being labeled with reference characters in FIGS. 1 to 3c in the interest of clarity) between which a plurality of permanent magnets 18 (in the present example, three permanent magnets 18) are received. In order to achieve a magnetic field that is sharply distinguishable along conduit path K, permanent magnets 18 are polarized along conduit axis K and arranged in pairs with like poles facing toward one another. What results from this arrangement is a magnetic field, proceeding from piston 14, which is very largely uniform around conduit axis K, i.e. substantially rotationally symmetrical with respect to conduit axis K, and exhibits a steep gradient in magnetic field strength along conduit axis K, so that unlike polarization zones alternate in sharply distinguishable fashion along conduit path K. It is thus possible, for example using Hall sensors of a position sensor arrangement 39, to achieve high positional resolution in terms of detecting the position of piston 14 along conduit axis K; and very efficient coupling of an external magnetic field to piston 14 can be achieved.

End caps 16 are preferably constituted from a low-friction material encompassing graphite or mica, as is known e.g. from commercially obtainable caps of the Airpot Corporation in Norwalk, Conn. (US). In order to allow the low friction furnished by this material to be exploited as completely as possible, pipetting conduit 11 preferably encompasses a cylinder 12 made of glass, so that upon a motion of piston 14 along conduit axis K, the graphite- or mica-containing material slides with extremely little friction against a glass surface.

Piston 14 thus constitutes a rotor of a linear motor 20 whose stator is constituted by coils 22 (only four coils being depicted here by way of example) that surround pipetting conduit 11.

Be it noted explicitly that FIGS. 1 to 3c are merely schematic longitudinally sectioned views of a pipetting apparatus 10 according to the present invention, and are not to be understood as being in any way to scale. In addition, pluralities of components are depicted by way of an arbitrary number of components, for example three permanent magnets 18 and four coils 22. In actuality, both the number of permanent magnets 18 and the number of coils 22 can be greater than or less than the number depicted.

Control is applied to linear motor 20, more precisely to its coils 22, by way of a control apparatus 24 that is signal-transferringly connected to coils 22. The transfer of electrical current in order to energize the coils, and thus to generate a magnetic field by way of them, is also considered a signal.

A pipette tip 26 is detachably mounted, in a manner known per se, on metering-side end 12a of cylinder 12. The connection of pipette tip 26 to metering-side longitudinal end 12a of cylinder 12 is again depicted merely schematically.

Pipette tip 26 defines in its interior a pipetting space or receiving space 28 that is accessible, at longitudinal end 26a remote from the coupling, exclusively through a pipetting opening 30. While it is attached to cylinder 12, pipette tip 26 prolongs pipetting conduit as far as pipette opening 30.

In the example of pipetting apparatus 10 depicted in FIG. 1, a quantity of dosage liquid 32 is received in pipetting space 28 (and thus in pipetting apparatus 10) immediately after termination of a conventional aspiration operation in the quasi-synchronous pipetting mode, using the same pipetting apparatus 10.

Working gas 34, which serves as a force mediator between piston 14 and dosage liquid 32, is permanently located between piston 14 and dosage liquid 32. Preferably only working gas 34, if applicable negligibly modified in terms of its chemical composition due to the uptake of volatile constituents from dosage liquid 32, is present between piston 14 and dosage liquid 32.

Working gas 34 is arranged between piston 34 and a dosage liquid 32 even when pipette tip 26 is completely empty, since pipette tip 26 is immersed into a corresponding dosage-liquid reservoir in order to aspirate dosage liquid 32, so that in that state a meniscus of dosage liquid 32 is present at least at pipetting opening 30. In any state of pipetting apparatus 10 which is relevant to a pipetting operation, working gas 34 is thus always completely present between piston 14 and a dosage liquid 32, and separates them from one another.

More precisely, working gas 34 is located between a metering-side end surface 14a of piston 14, which is constituted in the present example by an end surface of end cap 16 which faces toward metering opening 30 in an axial direction (with reference to conduit path K), and a pipetting-opening-distal meniscus 32a of dosage liquid 32 that is received as a liquid column in pipetting space 28.

A pressure sensor 38 can detect the pressure in the interior of pipetting conduit 11 (which also includes receiving space 28 that is pressure-communicatingly connected) and the pressure of working gas 34 between dosage liquid 32 and metering-side end surface 14a of piston 14, and transfer it via a signal lead to control device 24. Pressure sensor 38, or the pressure signals that are supplied by it and represent the pressure of working gas 34, can be utilized in order to control pipetting apparatus 10 in the conventional quasi-synchronous pipetting mode both for aspiration and for dispensing of dosage liquid 32.

Position sensor arrangement 39 for detecting the piston position is provided on pipetting conduit 11 and is signal-transferringly connected to control apparatus 24.

A preparation for a pulsed dispensing operation of pipetting apparatus 10 according to the present invention, and the pulsed dispensing operation itself, will be described below proceeding from the state shown in FIG. 1:

FIGS. 2a to 2c describe a preparation of pipetting apparatus 10 with which the accuracy of the pulsed dispensing operation depicted in FIGS. 3b to 3c can be considerably enhanced. This means substantially that smaller minimum dispensed doses can be delivered, with high reproducibility, than without corresponding preparation. The preparation is not part of the dispensing operation itself, since the quantity of dosage liquid present in the receiving space does not change during preparation, and the dispensing operation can proceed even without preparation. The manipulation of dosage liquid 32 received in pipette tip 26 during preparation furthermore occurs not in pulsed fashion but instead by synchronous or quasi-synchronous motion of piston 14 and dosage liquid 32.

Proceeding from the state of pipetting apparatus 10 immediately after aspiration of the predetermined dosage-liquid quantity 32 into pipette tip 26 in the conventional quasi-synchronous pipetting mode (see FIG. 1), control apparatus 24 energizes coils 22 in such a way that pipetting piston 14 is moved so as to generate a (first) negative pressure in working gas 34, i.e. is moved away from pipetting opening 30. This negative pressure is generated not in pulsed fashion but instead using piston accelerations and piston speeds that ensure a quasi-synchronous displacement of dosage-liquid quantity 32 received in receiving space 28.

The result is that dosage-liquid quantity 32 furnished in pipetting apparatus 10, more precisely in pipetting receiving space 28 of pipette tip 26, becomes displaced along conduit axis K away from pipetting opening 30 into pipetting apparatus 10, more precisely into pipette tip 26. Dosage liquid 32 that is furnished is delimited toward pipetting piston 14 by a meniscus 32a located farther from pipetting opening 30, and delimited toward pipetting opening 30 by a pipetting-opening-proximal meniscus 32b. The displacement of dosage liquid 32 away from pipetting opening 30 results in formation of a gas volume 35 between pipetting opening 30 and pipetting-opening-proximal meniscus 32b.

For a dosage-liquid quantity 32 that is assumed by way of example to be 40 µl, gas volume 35 immediately prior to triggering of the pulsed dispensing positive-pressure pulse is preferably 4 to 10 µl, particularly preferably 4 to 6 µl.

Meniscus 32b, which is present in an undefined shape, in particular with an undefined curvature, at pipetting opening 30 after aspiration, acquires a more strongly defined shape as a result of the displacement away from pipetting opening 30 of meniscus 32b, which is closer to the pipetting opening and therefore delivers the subsequent metered droplet. Although the shape of pipetting-opening-proximal meniscus 32b is not completely defined after the generation of gas volume 35 as shown in FIG. 2a, its shape nevertheless fluctuates only to a minor extent around a shape that is usually to be expected.

The shape of pipetting-opening-proximal meniscus 32b depends, for example, on the surface tension of dosage liquid 32, on its specific gravity, on its viscosity, and on the wettability of the wall of pipette tip 26.

As shown in FIG. 2b, control apparatus 24 can then drive coils 22 to move pipetting piston 14 so as to produce a pressure increase in working gas 34, i.e. to displace pipetting piston 14 toward pipetting opening 30. As a result, dosage liquid 32 furnished in pipette tip 26 becomes displaced back toward pipetting opening 30 but not beyond it. Gas volume 35 between pipetting opening 30 and pipetting-opening-proximal meniscus 32b thereby becomes smaller or in fact disappears entirely. This change in the working-gas pressure also occurs not in pulsed fashion but instead in accordance with a conventional, quasi-synchronous operating mode.

In addition, control apparatus 24 can drive coils 22 again to move pipetting piston 14 so as to decrease the pressure of working gas 34, i.e. to move it in an aspiration direction away from pipetting opening 30, with the result that a gas volume 35 once again becomes formed and/or enlarged between pipetting opening 30 and pipetting-opening-proximal meniscus 32b of dosage liquid 32. This too occurs in a conventional, quasi-synchronous pipetting mode. The result of the back-and-forth motion of dosage liquid 32 in pipette tip 26 as depicted in FIGS. 2a to 2c is that once generation of the second negative pressure as shown in FIG. 2c is complete, the meniscus 32b formed for a given dosage liquid 32 is always of the same shape; this is advantageous for the subsequent pulsed dispensing operation as depicted and described in FIGS. 3a to 3c. The advantage lies in the reduction of the minimum dispensable liquid quantity, and the improved repeatability thereof achievable in the context of aliquoting.

FIG. 3a depicts pipetting apparatus 10 of FIG. 2c on a separate sheet of drawings in order to facilitate a comparison of the various states of pipetting apparatus 10 immediately before and during generation of a pressure pulse.

The central point of the inventive idea of the present Application is a whip-like motion of piston 14. That whip-like motion is manifested in several ways.

Because of the preferred linear motor 20 that is furnished, piston 14 can be moved with an enormously dynamic motion along conduit axis K. In order to dispense a small quantity of liquid, for example 500 nl of dosage liquid 32, piston 14 is firstly moved rapidly toward metering opening 30 (in this case, in a dispensing direction) so as to generate a pressure elevation in working gas 34. Control apparatus 24 applies control to coils 22 of linear motor 20 in accordance with a detection result of position sensor arrangement 39, in such a way that piston 14 generates a pressure pulse in working gas 34 by being driven in regulated fashion to move in accordance with a target pipetting-piston position curve predefined in a data memory of control apparatus 24. Piston 14 executes a linear stroke P of sufficient length that metering-side end surface 14a of piston 14 sweeps out, along linear stroke P, a multiple of, for instance 40 times, the predetermined individual metered volume 36 (see FIG. 3c). In the position shown in FIG. 3b the piston is then located at the bottom dead-center point of its motion in a dispensing direction, whereupon piston 14 is driven to perform an oppositely directed motion in an aspiration direction, i.e. so as to reduce the pressure of working gas 34 (see arrow G).

In this portion of the piston motion in an aspiration direction as well, the motion of piston 14 is controlled in regulated fashion in accordance with a detection result of position sensor arrangement 39, in such a way that piston 14 is driven to move in accordance with a target pipetting-piston position curve predefined in a data memory of control apparatus 24.

In the present example, the initial pulsed or whip-like motion of piston 14 in a dispensing direction lasts less than 10 ms. Usually, no portion of dosage liquid 32 has yet detached from pipette tip 26 when piston reaches its bottom dead-center point. Pipetting-opening-proximal meniscus 32b is depicted in a shape that is preparatory for a droplet delivery. The shape of meniscus 32b is selected merely for illustrative purposes, in order to make it clear that delivery of a dosage-liquid droplet 36 (see FIG. 3c) is imminent. Pipetting-opening-distal meniscus 32a is shown with a concave curvature in order to depict the effect of the positive-pressure pulse on dosage liquid 32.

The piston is moved in a dispensing direction, for instance, at a maximum speed of approximately 10,000 μl/s, and is accelerated and decelerated again for that purpose with an acceleration of up to $8 \times 10^6$ μl/s². The maximum speed occurs only briefly, however. This means that in the instance recited, in which its metering-side end surface 14a sweeps out a volume approximately 40 times that of individual metered volume 36, i.e. approximately 20 μl, in the course of the dispensing motion, piston 14 requires approximately 6 to 8 ms for that dispensing motion.

Dosage liquid 32 is too sluggish to follow that piston motion. Instead, a pressure elevation pulse is transferred from piston 14 via working gas 34 to dosage liquid 32 in pipette tip 26. Proceeding from what is depicted in FIG. 3b, piston 14 is then accelerated as immediately as possible back in an aspiration direction, motion stroke length G in an aspiration direction being, in the present case, shorter than linear stroke P of the motion in a dispensing direction to such an extent that end-located piston surface 14a sweeps out, in the course of the motion in an aspiration direction, an aspirated volume that is smaller than the swept-out dispensed volume by an amount equal to individual metered volume 36.

This need not be the case, however. The aspirated volume can also be exactly the same size as the dispensed volume. An aspirated volume reduced by an amount equal to the individual metered volume 36 has the advantage, however, that the location of the pipetting-opening-proximal meniscus does not change after pipetting, which is advantageous especially in aliquoting mode.

In the final position of pipetting apparatus 10 as shown in FIG. 3c, after the end of the pulsed dispensing operation metering-side end surface 14a is at a distance from the initial position of FIG. 3a which is equal to a resulting stroke length H; in the example depicted, the piston area of piston 14 multiplied by the resulting stroke length H corresponds to individual metered volume 36.

The motion in an aspiration direction in the context of pulsed dispensing also proceeds at the aforesaid maximum speed, so that this motion as well requires approximately 6 to 8 ms. With additional dwell times at the bottom dead-center point which can occur as a result of overcoming the static friction limit, and incorporating any motion overshoots of piston 14 which might occur around its target position, the entire piston motion to the point of reaching the final position shown in FIG. 3c occurs in approximately 14 to 30 ms.

It is only after the piston motion reverses from the dispensing direction into the aspiration direction that a defined individual metered volume 36 is ejected away from pipetting opening 30 in the form of a droplet. This droplet moves along the notionally prolonged conduit path K to a metering destination placed below pipetting opening 30, for example a container or a well. Pipetting-opening-proximal meniscus 32b can continue to oscillate briefly after dosage-liquid droplet 36 is ejected.

Pipette tip 26 can have a nominal pipetting-space volume that substantially exceeds the individual metered volume, for example 200 to 400 μl, preferably 300 μl.

The motion of piston 14 in an aspiration direction in turn proceeds so quickly that a pressure reduction pulse is transferred from metering-side end surface 14a to dosage liquid 32 in pipetting space 28.

The pressure elevation pulse of the piston motion in a dispensing direction constitutes the steep leading edge of a pressure pulse whose steep trailing edge is constituted by the pressure reduction pulse of the piston motion in an aspiration direction. The more quickly the individual piston motion proceeds, the steeper the edge of the pressure modification pulse associated with it. The two pressure modification pulses acting in opposite directions can thus define a "hard" pressure pulse having steep edges.

The arrival of the "hard" pressure pulse that is thereby formed produces the extremely precise, repeatable dispensing result.

During the entire piston motion for generation of the pressure pulse having a positive-pressure component and a negative-pressure component, the piston motion is controlled by control apparatus 24 by corresponding application of a voltage to coils 22, in such a way that the position of pipetting piston 14 during the pressure pulse follows a predefined target pipetting-piston position curve.

In consideration also of position-detection signals of position sensor arrangement 39, pipetting piston 14 can be brought into a defined final position at the end of the dispensing operation.

Surprisingly, the dispensing operation presented here is independent of the size of the selected pipette tip 26. The same piston motion as described above would produce exactly the same result even with a considerably smaller pipette tip having, for instance, a nominal pipetting-space volume of 50 μl, provided the same working gas and the same dosage liquid continue to be used, with no change in the dispensing parameters.

The present pipetting apparatus according to the present invention and the pulsed dispensing method presented according to the present invention are thus outstandingly suitable for aliquoting liquids even from large reservoirs of dosage liquid 32 received in pipette tips 26. Under otherwise identical conditions, the dispensing behavior of pipetting apparatus 10 does not change even over a large number of aliquoting cycles. The dispensing behavior of pipetting apparatus 10 according to the present invention is thus also independent of the fill level of a pipette tip 26 attached to cylinder 12, as long as that tip is filled sufficiently for pulsed dispensing.

Because of inertia, the piston motion may possibly not follow with complete accuracy the control signal on which the motion is based. The piston may tend to overshoot around the target position points of highly dynamic forces, namely upon reversal of the motion direction from the dispensing direction to the aspiration direction but also as the piston comes to a halt. The control signals on which the motion is based, which map a target motion, are therefore to be considered authoritative in the event of doubt.

Be it noted expressly that a pulsed dispensing action can also occur starting from the state as shown in FIG. 1, i.e. with no prior formation of pipetting-opening-proximal gas volume 35.

Figure 4:
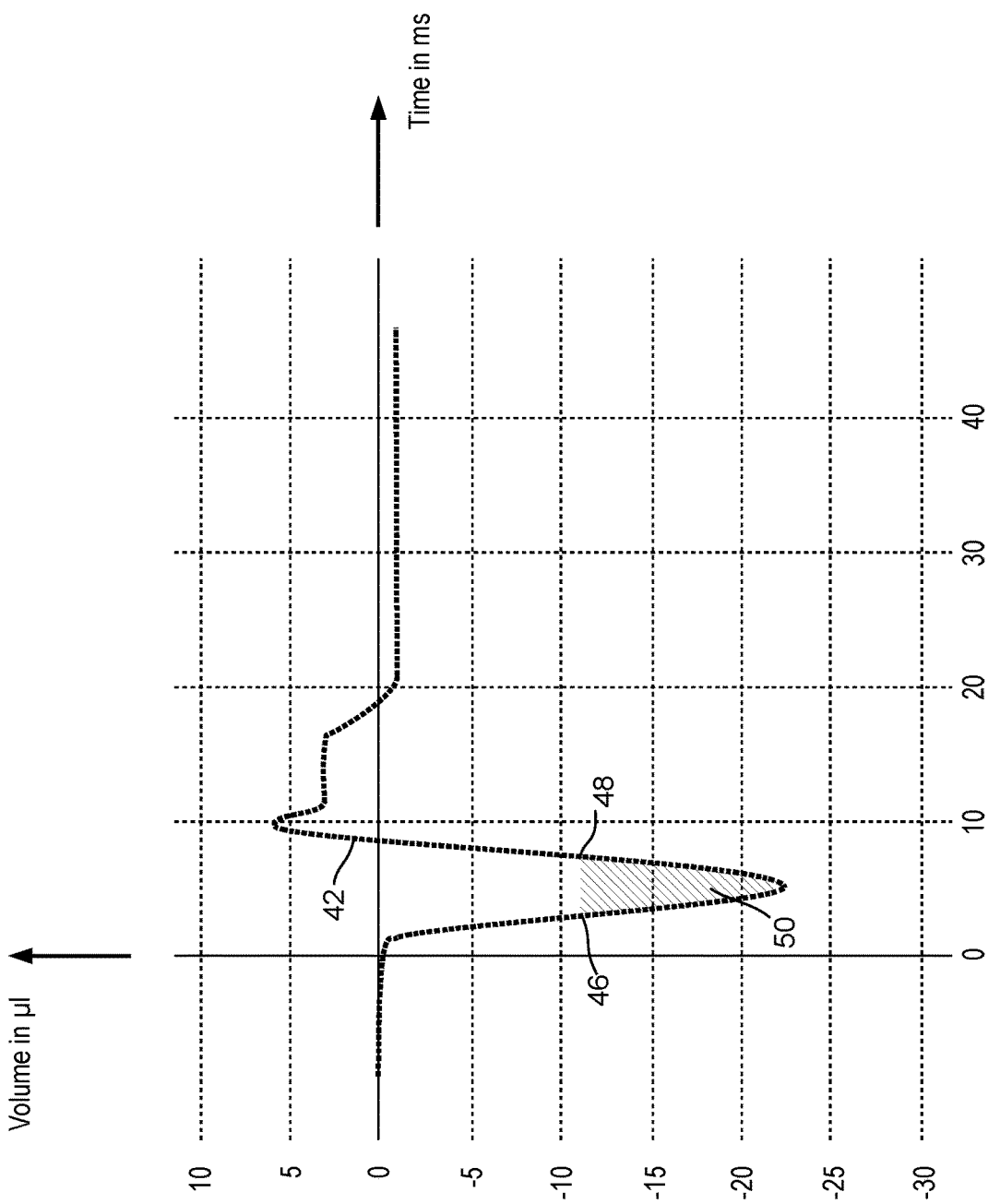
FIG. 4 shows a schematic curve for the volume swept out by the pipetting piston in a context of exemplifying pulsed dispensing of approximately 1 μl of dosage liquid.

FIG. 4 schematically depicts, merely by way of example, a time-related curve 42 of the motion of piston 14 (dashed line), as it might exist in the context of a dispensing operation of FIGS. 3a to 3c.

The zero-point line selected in FIG. 4 is the current piston position at the beginning of the dispensing operation, i.e. the piston position shown in FIG. 3a.

The abscissa of the depiction of FIG. 4 shows time in milliseconds, a 10-ms interval having been selected.

The ordinate shows volume in microliters, the volume on the ordinate axis indicating, with reference to location/time curve 42 of piston 14, the volume swept out by metering-side end surface 14a of piston 14.

The numbers 46 and 48 indicate the locations of the "half-travel distance" of piston 14 between its starting position at 0 μl and its motion direction reversal point at approximately −22.5 μl. The half-travel distance is thus located at approximately −11.25 μl.

The time integral of the location/time curve of piston 14—represented e.g. by the location/time curve of metering-side piston surface 14a constituting a reference point of piston 14—between passage through the location of the half-travel distance upon motion in a dispensing direction and passage through that location again during its motion in an aspiration direction, is an indicator of individual metered volume 36 that is actually dispensed in pulsed fashion by the piston motion. An area constituted by that integral is depicted with cross-hatching as area 50 in FIG. 4. The correlation between the planar area of area 50 and the actually pipetted individual metered volume 36 can easily be ascertained empirically for different categories of liquids, and stored in a data memory of pipetting apparatus 10.

Very small individual metered volumes 36 of 2 μl or less can thus be dispensed in pulsed fashion with a very high degree of reproducibility, using the same pipetting apparatus 10 with which large pipetting volumes (several hundreds of μl) can also be both aspirated and dispensed in a conventional quasi-synchronous pipetting mode.

Figure 5:
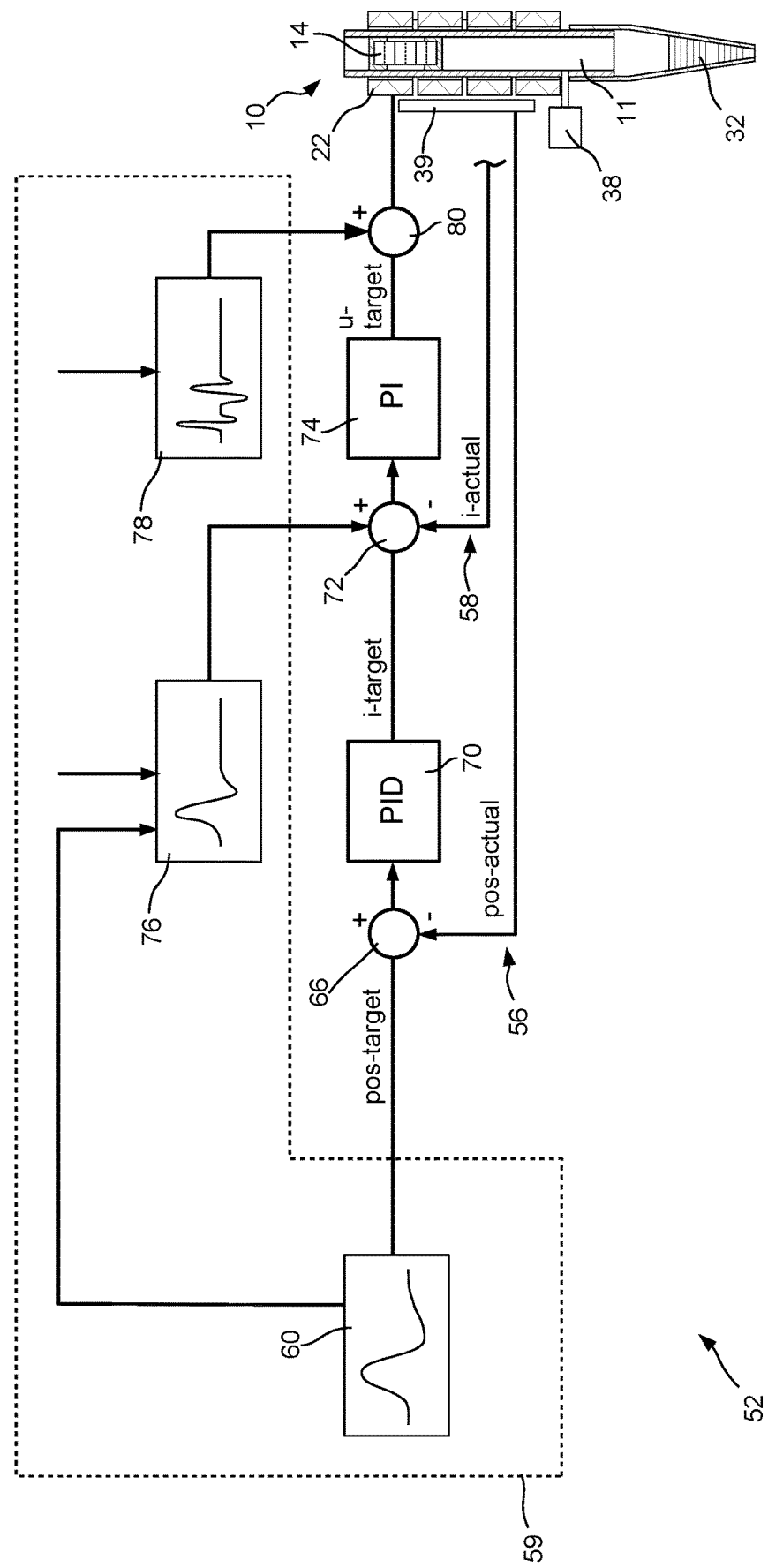
FIG. 5 shows an exemplifying regulation structure used by the control apparatus of the pipetting apparatus according to the present invention to control the motion of the pipetting piston depending on a detected position of the pipetting piston.

FIG. 5 schematically depicts a regulation structure 52 that can be used in control apparatus 24.

Regulation structure 52 is a cascaded regulation structure having an external control loop 56 and an internal control loop 58.

A target pipetting-piston position curve 60, which contains target values of the pressure in the working gas as a function of time for a pulsed dispensing operation for dispensing a predetermined volume of liquid, is stored in a data memory 59 of control apparatus 24.

A plurality of target pipetting-piston position curves can in fact be stored in data memory 59 of control apparatus 24, sorted multidimensionally for different categories of liquid and, within the different categories of liquid, for different quantities of liquid.

Depending on the required dosage-liquid quantity indicated by manual data input or by data transfer from another apparatus, control apparatus 24 selects, for the categories of liquid likewise indicated by manual data input or by automatic data transfer, the predetermined target pipetting-piston position curve 60 that is correct for the indicated dosage-liquid quantity, and delivers it to an external operator 66. The detection result of position sensor arrangement 39, and thus the actual position of pipetting piston 14, is also delivered to this first operator 66. First operator 66 thus outputs a pipetting-piston position difference value which is an indicator, for each detection time, of the difference between the currently valid target pipetting-piston position and the detected actual pipetting-piston position.

The predetermined target pipetting-piston position curve 60 is furthermore stored in data memory 59 of control apparatus 24 for advantageously rapid pilot control of the motion of pipetting piston 14. The value of the pipetting-piston position which results for the respective detection time in accordance with the predetermined target pipetting-piston position curve 60 is likewise delivered to first operator 66 in the course of a pilot control operation known per se.

A value representing the difference between a target pipetting-piston position and an actual pipetting-piston position is delivered by first operator 66 to the first, external controller 70, which is advantageously configured as a PID controller. Its transfer function ascertains, from the difference value representing the difference between the target position and actual position of pipetting piston 14, a target value for the current flowing at the detection time in coils 22 of motion drive system 20. This target current value is delivered to a second operator 72. Also delivered to second operator 72 is the actual current value at the detection time, which can readily be ascertained at coils 22 in a manner known per se.

Second operator 72 thus ascertains a value representing the difference between the target current value and the actual current value at the detection time, and delivers that value to second, internal controller 74. Advantageously, the second, or internal, controller 74 exhibits a PI control behavior.

A predetermined target coil-current curve 76, which results from the predetermined target pipetting-piston position curve 60, is stored in the data memory of control apparatus 24.

The predetermined target coil-current value valid for the respective detection time is delivered from the predetermined target pipetting-piston position curve 76 to second operator 72 in the course of a pilot control operation, known per se, in order to obtain maximally rapid regulation of the motion of pipetting piston 14 in such a way that the motion of pipetting piston 14 matches as accurately as possible the target pipetting-piston position curve 60 selected for the particular pipetting operation.

The transfer function of second, or internal, controller 74 ascertains, from the input value that is obtained from second operator 72 and represents the difference between the target current value and actual current value at the detection time, a target coil-voltage value at the detection time which is applied to coils 22.

Control-loop structure 52 can exist separately for each phase of coils 22.

A predetermined target coil-voltage curve 78, which is obtained from the predetermined target pipetting-piston position curve 60 and/or from the predetermined target coil-current value curve 76, is in turn stored in the data memory of control apparatus 24 in order to achieve maximally fast and highly accurate control of the piston position for pilot control of the coil voltage as well.

A third operator 80, for executing pilot control of the coil voltage by means of the predetermined target coil-voltage curve, is depicted.

With the cascaded regulation structure shown in FIG. 5, pipetting piston 14 can be moved within a few milliseconds, by application of an operating voltage to coils 22 on the basis of the detected pipetting-piston position and the detected coil current, so accurately that the pipetting-piston position substantially follows a predefined pipetting-piston position curve.

Figure 6:
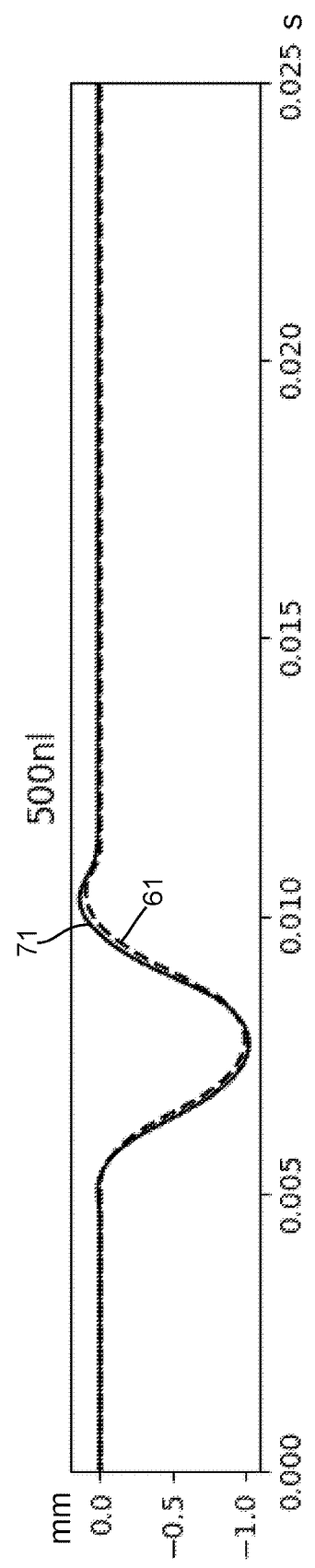
FIG. 6 is an exemplifying diagram of a target pipetting-piston position curve and an actual pipetting-piston position curve for pulsed dispensing of a dosage-liquid volume of 500 nl.
Figure 7:
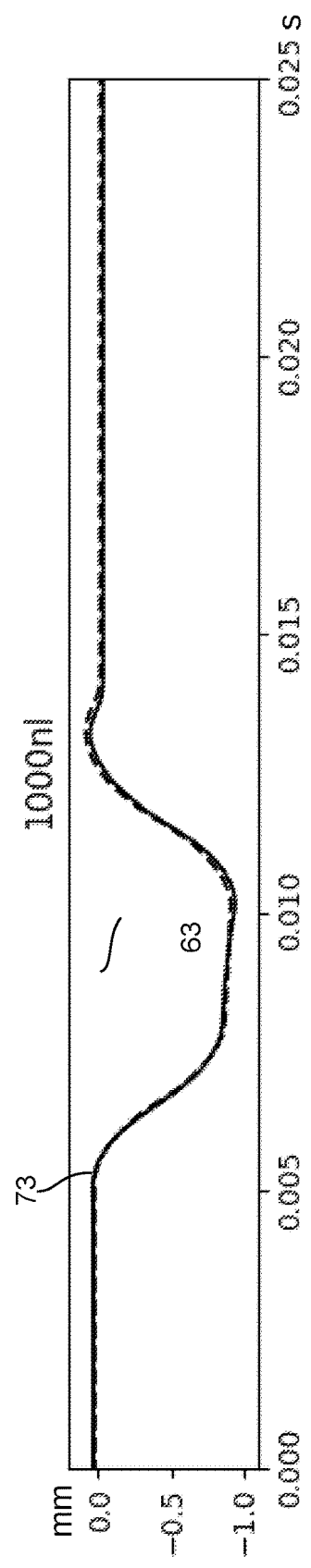
FIG. 7 is an exemplifying diagram of a target pipetting-piston position curve and an actual pipetting-piston position curve for pulsed dispensing of a dosage-liquid volume of 1 μl.
Figure 8:
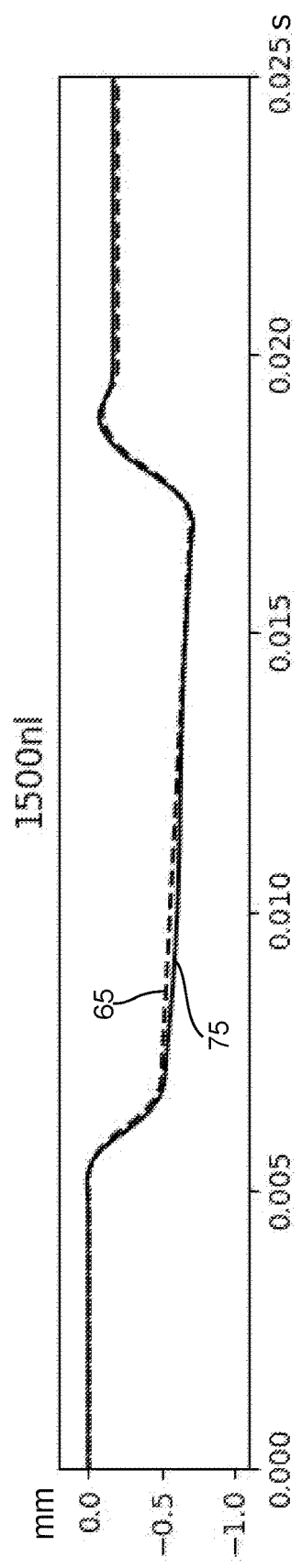
FIG. 8 is an exemplifying diagram of a target pipetting-piston position curve and an actual pipetting-piston position curve for pulsed dispensing of a dosage-liquid volume of 1.5 μl.

In FIGS. 6 to 8, target pipetting-piston position curves and actual pipetting-piston position curves are plotted for different dosage-liquid quantities 36, to be dispensed in pulsed fashion, of a given dosage liquid that was dispensed in pulsed fashion using a given pipetting apparatus. The abscissa of the graphs in FIGS. 6 to 8 shows time in seconds, a time span of 25 ms being depicted in each of FIGS. 6 to 8.

The ordinate of the graphs of FIGS. 6 to 8 shows a piston stroke in millimeters, the starting position of pipetting piston 14 having a coordinate of 0 mm.

In FIGS. 6 to 8, the respective target pipetting-piston position curve is plotted with a dashed line, in millimeters, as a function of time in seconds, and labeled with the reference character 61 (FIG. 6), 63 (FIG. 7), and 65 (FIG. 8).

In the aforesaid Figures, the actual pipetting-piston position curve is likewise plotted with a solid line, in millimeters, as a function of time in seconds, and labeled with reference characters 71 (FIG. 6), 73 (FIG. 7), and 75 (FIG. 8).

Negative ordinate values denote a displacement of the pipetting piston in a dispensing direction, proceeding from the starting position of the dispensing operation which is located at the value of 0 mm. Positive ordinate values correspondingly denote a location of the pipetting piston on the aspiration side with respect to the starting position.

FIG. 6 shows position curves 61 and 71 for a dosage-liquid volume of 500 nl that is to be dispensed in pulsed fashion. At approximately 5 ms, the displacement of pipetting piston 14 in a dispensing direction toward pipetting opening 30 begins. The pressure of working gas 34 in receiving space 28 will therefore increase. At approximately 8 ms, pipetting piston 14 reaches its position of closest proximity to pipetting opening 30, characterized by the quantitatively greatest value on the dispensing side of the starting position of piston 14. A motion reversal of pipetting piston 14 immediately begins here, the piston then being moved in an aspiration direction as evidenced by the negative values whose absolute value becomes smaller.

At approximately 9.5 ms, pipetting piston 14 reaches its starting position again. It is moved beyond that position in an aspiration direction, however, until it reaches its position of maximum distance from pipetting opening 30 approximately in the range between 1.03 and 1.06 ms. From there the pipetting piston is moved back in a dispensing direction to the starting position, which it reaches approximately at 1.12 ms, i.e. approximately 6.1 to 6.2 ms after piston motion began in the context of the dispensing operation.

Detachment of the dosage-liquid droplet occurs only after the position of closest proximity to pipetting opening 30 has been reached. This is also true for the dispensing actions of FIGS. 7 and 8.

FIG. 7 shows target pipetting-piston position curve 63 and actual pipetting-piston position curve 73 for a dosage-liquid volume of 1 µl which is to be dispensed in pulsed fashion. As evidenced by the almost coincident target and actual position curves 63 and 73, the piston motion for this dispensing operation lasts approximately 9 ms, namely from approximately the 5 ms point in time to 14 ms. For dispensing, pipetting piston 14 is once again first brought closer to pipetting opening 30, in part in fact at a constant speed. In the example depicted, the phase of constant piston speed lasts from approximately 7.8 to 10.2 ms. Shortly after the constant-speed phase ends, pipetting piston 14 reaches its position of closest proximity to pipetting opening 30.

At approximately 12.75 ms, pipetting piston 14 once again reaches its starting position, and at approximately 13.2 ms reaches its position of maximum distance from the pipetting opening. Piston motion ends at approximately 14 ms.

In FIG. 8, target pipetting-piston position curve 65 and actual pipetting-piston position curve 75 are plotted for a pulsed dispensing operation of a dosage-liquid droplet of 1.5 µl.

Once again, the motion of pipetting piston 14 begins at approximately 5 ms with a motion toward pipetting opening 30. After an acceleration phase, starting at approximately 7 ms piston 14 is moved at a constant speed in a dispensing direction. The motion at a constant approach speed toward pipetting opening 30 ends approximately at 17 ms. Shortly thereafter, piston 14 is at its maximum proximity to pipetting opening 30.

For the large liquid quantity that is to be metered in pulsed fashion, pipetting piston 14 no longer reaches its starting position. At approximately 18.8 ms, pipetting piston 14 reaches its position of greatest distance from pipetting opening 30, and at approximately 19.5 ms, i.e. approximately 14.5 ms after the motion of the pipetting piston began, that motion has ended.

As the exemplifying embodiments show, in very general terms the motion of the pipetting piston can exhibit phases of constant piston motion. Preferably those phases at least are not shorter, preferably in fact are longer, during the initial, first piston motion in a dispensing direction than in the phase, subsequent thereto, of piston motion in an aspiration direction.

As the metered quantity metered in pulsed fashion which is dispensed with the same pipetting apparatus increases, the motion pulse of the pipetting piston can become longer, but, surprisingly, the piston stroke length traveled in the first dispensing motion becomes shorter. For the 1.5 µl dispensed in accordance with FIG. 8, the piston stroke length is only about 0.7 mm in a dispensing direction, whereas it was equal to 0.95 mm for the metered quantity of 1 µl as shown in FIG. 7, and approximately 1 mm for the 0.5 µl quantity of FIG. 6.

In contrast thereto, the piston stroke length from the position of maximum distance from the pipetting opening into the final position at the end of the piston motion of a dispensing operation is approximately the same regardless of the metered quantity. At the least, for different metered volumes or quantities dispensed in pulsed fashion the piston positions of maximum distance from the pipetting opening and final position quantitatively differ less than do the piston positions of the starting position and that of closest proximity to the pipetting opening.

The reproducibility values for dispensed dosage-liquid volumes achievable with the present regulating method are in the range of less than 3%.

The invention claimed is:

1. A pipetting apparatus for pulsed pipetting of dosage liquids in small metered volumes of less than 2 μl with the aid of a modifiable-pressure working gas, the pipetting apparatus comprising:
   a pipetting conduit at least partly filled with a working gas;
   a pipette tip that furnishes a receiving space that is at least partly filled with the working gas, that is pressure-communicating connected to the pipetting conduit, and that is accessible through a pipetting opening, so that by a modification of the pressure of the working gas in the receiving space, a quantity of dosage liquid received in the receiving space is modifiable through the pipetting opening;
   a pipetting piston received in the pipetting conduit, movably along the pipetting conduit, for modifying the pressure of the working gas;
   a motion drive system for driving the pipetting piston to move along the pipetting conduit;
   a control apparatus for applying control to the motion drive system; and
   a position detection apparatus for detecting the position of the pipetting piston and for outputting to the control apparatus the position signal representing the position of the pipetting piston,
   the control apparatus being configured to apply control to the motion drive system in order to generate a pressure pulse—with respect to a reference pressure which exists in the pipetting conduit immediately before a pipetting operation begins and at which no fluid passes through the pipetting opening—in the pipetting conduit, on the basis of the position signal outputted by the position detection apparatus, in such a way that the position of the pipetting piston during the pulse follows a predefined target pipetting-piston position curve, the duration of the pipetting-piston motion for generation of the pressure pulse not exceeding 35 ms,
   wherein the position detection apparatus comprises at least one position sensor that is configured to detect the position of the pipetting piston and to output to the control apparatus the position signal indicating the detected piston position.

2. The pipetting apparatus according to claim 1, wherein the pressure pulse of the pipetting operation encompasses a positive-pressure component and a negative-pressure component with respect to the reference pressure.

3. The pipetting apparatus according to claim 2, wherein an effective piston surface of the pipetting piston sweeps out, upon pulsed dispensing of dosage liquid during generation of the positive-pressure component of the pressure pulse, at least 1.4 times the volume of the dosage liquid dispensed in pulsed fashion.

4. The pipetting apparatus according to claim 1, wherein the target pipetting-piston position curve contains target pipetting-piston positions on either side of the starting position and/or on either side of the final position of the pipetting piston at the beginning of the pipetting operation.

5. The pipetting apparatus according to claim 1, wherein the pipetting piston is a magnetic piston having at least one permanent magnet; and the motion drive system comprises electrically energizable coils, the control apparatus being embodied to control the supply of electrical energy to the coils.

6. The pipetting apparatus according to claim 5, wherein the control apparatus controls the supply of electrical energy to the coils depending on a detected instantaneous state of the supply of electrical energy to the coils, and depending on the position signal.

7. The pipetting apparatus according to claim 6, wherein the control apparatus encompasses a cascaded control-loop structure, the control apparatus being embodied to establish, in an internal control loop of the cascaded control-loop structure, an electrical voltage applied to the coils in accordance with a difference between a target current value and a detected current value of a current flowing in the coils, the control apparatus further being embodied to establish the target current value of the current flowing in the coils, in an external control loop of the cascaded control-loop structure, in accordance with a difference between a target position value and an actual position value, indicated by the position signal, of the pipetting piston.

8. The pipetting apparatus according to claim 1, wherein the control apparatus encompasses a data memory in which at least one predetermined target pipetting-piston position curve is stored for pilot control.

9. The pipetting apparatus according to claim 8, wherein a predetermined target coil-current curve that brings about the predetermined target pipetting-piston position curve is stored in the data memory for pilot control.

10. The pipetting apparatus according to claim 9, wherein a predetermined target coil-voltage curve that brings about the predetermined target coil-current curve is stored in the data memory for pilot control.

11. The pipetting apparatus according to claim 8, wherein a plurality of predetermined target pipetting-piston position curves is stored in the data memory, one target pipetting-piston position curve being selectable, depending at least on the dosage liquid and on the quantity of liquid to be pipetted, from the plurality of predetermined target pipetting-piston position curves as an active predetermined target pipetting-piston position curve for the respective pipetting operation.

12. The pipetting apparatus according to claim 1, wherein pulsed dispensing of dosage liquid takes place out of a dosage-liquid quantity received in the receiving space of the pipette tip, the volume of the received dosage-liquid quantity being at least five times greater than the volume of the dosage liquid to be dispensed in pulsed fashion in a dispensing operation.

13. The pipetting apparatus according to claim 1, wherein the pipetting apparatus is also configured for conventional, non-pulsed aspiration of dosage liquid.

14. The pipetting apparatus according to claim 1, wherein the pipetting apparatus is embodied for pulsed dispensing in a jet mode, in which the dispensed liquid volume travels a certain distance in free flight between the delivering dosage-liquid quantity in the pipette tip and a dispensing destination.

15. A pipetting apparatus for pulsed pipetting of dosage liquids in small metered volumes of less than 2 μl with the aid of a modifiable-pressure working gas, the pipetting apparatus comprising:
   a pipetting conduit at least partly filled with a working gas;

a pipette tip that furnishes a receiving space that is at least partly filled with the working gas, that is pressure-communicating connected to the pipetting conduit, and that is accessible through a pipetting opening, so that by a modification of the pressure of the working gas in the receiving space, a quantity of dosage liquid received in the receiving space is modifiable through the pipetting opening;

a pipetting piston received in the pipetting conduit, movably along the pipetting conduit, for modifying the pressure of the working gas;

a motion drive system for driving the pipetting piston to move along the pipetting conduit;

a control apparatus for applying control to the motion drive system; and a position detection apparatus for detecting the position of the pipetting piston and for outputting to the control apparatus the position signal representing the position of the pipetting piston, the control apparatus being configured to apply control to the motion drive system in order to generate a pressure pulse—with respect to a reference pressure which exists in the pipetting conduit immediately before a pipetting operation begins and at which no fluid passes through the pipetting opening—in the pipetting conduit, on the basis of the position signal outputted by the position detection apparatus, in such a way that the position of the pipetting piston during the pulse follows a predefined target pipetting-piston position curve, the duration of the pipetting-piston motion for generation of the pressure pulse not exceeding 35 ms, wherein the control apparatus encompasses a data memory in which at least one predetermined target pipetting-piston position curve is stored for pilot control.

16. The pipetting apparatus according to claim 15, wherein a predetermined target coil-current curve that brings about the predetermined target pipetting-piston position curve is stored in the data memory for pilot control.

17. The pipetting apparatus according to claim 16, wherein a predetermined target coil-voltage curve that brings about the predetermined target coil-current curve is stored in the data memory for pilot control.

18. The pipetting apparatus according to claim 15, wherein a plurality of predetermined target pipetting-piston position curves is stored in the data memory, one target pipetting-piston position curve being selectable, depending at least on the dosage liquid and on the quantity of liquid to be pipetted, from the plurality of predetermined target pipetting-piston position curves as an active predetermined target pipetting-piston position curve for the respective pipetting operation.

19. A pipetting apparatus for pulsed pipetting of dosage liquids in small metered volumes of less than 2 µl with the aid of a modifiable-pressure working gas, the pipetting apparatus comprising:

a pipetting conduit at least partly filled with a working gas;

a pipette tip that furnishes a receiving space that is at least partly filled with the working gas, that is pressure-communicating connected to the pipetting conduit, and that is accessible through a pipetting opening, so that by a modification of the pressure of the working gas in the receiving space, a quantity of dosage liquid received in the receiving space is modifiable through the pipetting opening;

a pipetting piston received in the pipetting conduit, movably along the pipetting conduit, for modifying the pressure of the working gas;

a motion drive system for driving the pipetting piston to move along the pipetting conduit;

a control apparatus for applying control to the motion drive system; and a position detection apparatus for detecting the position of the pipetting piston and for outputting to the control apparatus the position signal representing the position of the pipetting piston, the control apparatus being configured to apply control to the motion drive system in order to generate a pressure pulse—with respect to a reference pressure which exists in the pipetting conduit immediately before a pipetting operation begins and at which no fluid passes through the pipetting opening—in the pipetting conduit, on the basis of the position signal outputted by the position detection apparatus, in such a way that the position of the pipetting piston during the pulse follows a predefined target pipetting-piston position curve, the duration of the pipetting-piston motion for generation of the pressure pulse not exceeding 35 ms, wherein the pipetting apparatus is also configured for conventional, non-pulsed aspiration of dosage liquid.

* * * * *